US008214845B2

(12) United States Patent
Hoover et al.

(10) Patent No.: US 8,214,845 B2
(45) Date of Patent: Jul. 3, 2012

(54) CONTEXT SWITCHING IN A NETWORK ON CHIP BY THREAD SAVING AND RESTORING POINTERS TO MEMORY ARRAYS CONTAINING VALID MESSAGE DATA

(75) Inventors: Russell D. Hoover, Rochester, MN (US); Eric O. Mejdrich, Rochester, MN (US); Paul E. Schardt, Rochester, MN (US); Robert A. Shearer, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1090 days.

(21) Appl. No.: 12/118,039

(22) Filed: May 9, 2008

(65) Prior Publication Data

US 2009/0282226 A1 Nov. 12, 2009

(51) Int. Cl.
*G06F 9/46* (2006.01)
*G06F 13/00* (2006.01)
*G06F 9/00* (2006.01)

(52) U.S. Cl. ......... 718/108; 711/147; 712/228; 719/312

(58) Field of Classification Search .................. 718/108; 711/147; 712/228; 719/312
See application file for complete search history.

(56) References Cited

U.S. PATENT DOCUMENTS 4,813,037 A 3/1989 Debuysscher et al.
4,951,195 A 8/1990 Fogg et al.
5,167,023 A 11/1992 De Nicolas et al.
5,301,302 A 4/1994 Blackard et al.
5,442,797 A 8/1995 Casavant et al.
5,590,308 A 12/1996 Shih
5,761,516 A 6/1998 Rostoker et al.
5,784,706 A 7/1998 Oberlin et al.
5,870,479 A 2/1999 Feiken et al.
5,872,963 A * 2/1999 Bitar et al. .................... 712/233
5,884,060 A 3/1999 Vegesna et al.
5,887,166 A 3/1999 Mallick et al.
5,974,487 A 10/1999 Hartmann (Continued)

FOREIGN PATENT DOCUMENTS

CN 1599471 3/2005

(Continued)

OTHER PUBLICATIONS

Office Action, U.S. Appl. No. 11/945,396, Mar. 3, 2011.

(Continued)

*Primary Examiner* — Jennifer To
*Assistant Examiner* — Brian Chew
(74) *Attorney, Agent, or Firm* — Biggers & Ohanian LLP

(57) ABSTRACT

A network on chip ('NOC') that includes IP blocks, routers, memory communications controllers, and network interface controllers, each IP block adapted to the network by an application messaging interconnect including an inbox and an outbox, one or more of the IP blocks including computer processors supporting a plurality of threads, the NOC also including an inbox and outbox controller configured to set pointers to the inbox and outbox, respectively, that identify valid message data for a current thread; and software running in the current thread that, upon a context switch to a new thread, is configured to: save the pointer values for the current thread, and reset the pointer values to identify valid message data for the new thread, where the inbox and outbox controller are further configured to retain the valid message data for the current thread in the boxes until context switches again to the current thread.

18 Claims, 7 Drawing Sheets

U.S. PATENT DOCUMENTS 6,021,470 A 2/2000 Frank et al.
6,044,478 A 3/2000 Green
6,047,122 A 4/2000 Spiller
6,049,866 A 4/2000 Earl
6,085,296 A 7/2000 Karkhanis et al.
6,085,315 A 7/2000 Fleck et al.
6,101,599 A 8/2000 Wright et al.
6,105,119 A 8/2000 Kerr et al.
6,119,215 A 9/2000 Key et al.
6,145,072 A 11/2000 Shams et al.
6,151,668 A 11/2000 Pechanek et al.
6,164,841 A 12/2000 Mattson et al.
6,272,598 B1 8/2001 Arlitt et al.
6,292,888 B1 9/2001 Nemirovsky et al.
6,370,622 B1 4/2002 Chiou et al.
6,434,669 B1 8/2002 Arimilli et al.
6,446,171 B1 9/2002 Henriksen
6,493,817 B1 12/2002 Renstrom
6,519,605 B1 2/2003 Gilgen et al.
6,567,895 B2 5/2003 Scales
6,591,347 B2 7/2003 Tischler et al.
6,625,662 B1 9/2003 Satoh et al.
6,668,307 B1 12/2003 Damron
6,668,308 B2 12/2003 Barroso et al.
6,675,284 B1 1/2004 Warren
6,697,932 B1 2/2004 Yoaz et al.
6,725,317 B1 4/2004 Bouchier et al.
6,823,429 B1 11/2004 Olnowich
6,832,184 B1 12/2004 Bleier et al.
6,877,086 B1 4/2005 Boggs et al.
6,891,828 B2 5/2005 Ngai
6,898,791 B1 5/2005 Chandy et al.
6,915,402 B2 7/2005 Wilson et al.
6,938,253 B2 8/2005 Kim
6,950,438 B1 9/2005 Owen et al.
6,973,032 B1 12/2005 Casley et al.
6,988,149 B2 1/2006 Odenwald
7,010,580 B1 3/2006 Fu et al.
7,015,909 B1 3/2006 Morgan III et al.
7,072,996 B2 7/2006 Adusumilli et al.
7,162,560 B2 1/2007 Taylor et al.
7,376,789 B2 5/2008 Halleck et al.
7,394,288 B1 7/2008 Agarwal
7,398,374 B2 7/2008 DeLano
7,464,197 B2 12/2008 Ganapathy et al.
7,478,225 B1 1/2009 Brooks et al.
7,493,474 B1 2/2009 Pechanek et al.
7,500,060 B1 3/2009 Anderson et al.
7,502,378 B2 3/2009 Lajolo et al.
7,521,961 B1 4/2009 Anderson
7,533,154 B1 5/2009 Chen et al.
7,539,124 B2 5/2009 Rhim et al.
7,546,444 B1 6/2009 Wolrich et al.
7,568,064 B2 7/2009 Reblewski et al.
7,590,774 B2 9/2009 Johns et al.
7,613,882 B1 11/2009 Akkawi et al.
7,664,108 B2 2/2010 Bahattab
7,689,738 B1 3/2010 Williams et al.
7,701,252 B1 4/2010 Chow et al.
7,861,065 B2 12/2010 Heil et al.
7,882,307 B1 * 2/2011 Wentzlaff et al. ............. 711/119
7,886,084 B2 2/2011 Chen et al.
7,913,010 B2 3/2011 Hoover et al.
7,917,703 B2 3/2011 Comparan et al.
7,958,340 B2 6/2011 Hoover et al.
7,991,978 B2 8/2011 Kuesel et al.
8,010,750 B2 8/2011 Comparan et al.
8,018,466 B2 9/2011 Hoover et al.
8,020,168 B2 9/2011 Hoover et al.
8,040,799 B2 10/2011 Hoover et al.
2002/0099833 A1 7/2002 Steely et al.
2002/0178337 A1 11/2002 Wilson et al.
2003/0065890 A1 4/2003 Lyon
2004/0037313 A1 2/2004 Gulati et al.
2004/0083341 A1 4/2004 Robinson et al.
2004/0088487 A1 5/2004 Barroso et al.
2004/0151197 A1 8/2004 Hui
2004/0153579 A1 8/2004 Shih et al.
2004/0216105 A1 10/2004 Burky et al.
2004/0250046 A1 12/2004 Gonzalez et al.
2004/0260906 A1 12/2004 Landin et al.
2005/0044319 A1 2/2005 Olukotun
2005/0086435 A1 4/2005 Todoroki
2005/0097184 A1 5/2005 Brown et al.
2005/0149689 A1 7/2005 Sodani et al.
2005/0160209 A1 7/2005 Van Doren et al.
2005/0166205 A1 7/2005 Oskin et al.
2005/0198442 A1 9/2005 Mandler
2005/0203988 A1 9/2005 Nollet et al.
2005/0238035 A1 10/2005 Riley
2006/0095920 A1 5/2006 Gossens
2006/0101249 A1 5/2006 Bacon et al.
2006/0203825 A1 9/2006 Beigne et al.
2006/0209846 A1 9/2006 Clermidy et al.
2006/0242393 A1 10/2006 Park et al.
2007/0055826 A1 3/2007 Morton et al.
2007/0055961 A1 3/2007 Callister et al.
2007/0076739 A1 4/2007 Manjeshwar et al.
2007/0180310 A1 * 8/2007 Johnson et al. ................ 714/12
2007/0271557 A1 11/2007 Geisinger
2007/0283324 A1 12/2007 Geisinger
2008/0028401 A1 1/2008 Geisinger
2008/0133885 A1 6/2008 Glew
2008/0134191 A1 6/2008 Warrier et al.
2008/0181115 A1 7/2008 Soulie et al.
2008/0186998 A1 8/2008 Rijpkema
2008/0205432 A1 8/2008 Gangwal
2008/0216073 A1 9/2008 Yates et al.
2008/0307422 A1 12/2008 Kurland et al.
2008/0320235 A1 12/2008 Beckman et al.
2009/0019190 A1 1/2009 Blocksome
2009/0083263 A1 3/2009 Felch et al.
2009/0125574 A1 5/2009 Mejdrich et al.
2009/0125703 A1 5/2009 Mejdrich et al.
2009/0125706 A1 5/2009 Hoover et al.
2009/0135739 A1 5/2009 Hoover et al.
2009/0231349 A1 9/2009 Mejdrich et al.
2009/0260013 A1 10/2009 Heil et al.
2009/0282222 A1 11/2009 Hoover et al.

FOREIGN PATENT DOCUMENTS

CN 1599471 A 3/2005

OTHER PUBLICATIONS

Final Office Action, U.S. Appl. No. 12/118,017, Mar. 28, 2011.
Final Office Action, U.S. Appl. No. 11/937,579, Feb. 23, 2011.
Office Action, U.S. Appl. No. 12/108,770, Apr. 12, 2011.
Final Office Action, U.S. Appl. No. 12/117,906, Mar. 28, 2011.
Office Action, U.S. Appl. No. 12/060,559, Apr. 1, 2011.
Nollet et al., "Centralized Run-Time Resource Management in a Network-on-Chip Containing Reconfigurable Hardware Tiles" [online] 2005 [retrieved Jul. 15, 2011], URL: http://portal.acm.org/ft_gateway.cfm?id=1049106&type=pdf&CFID=32720390&CFTOKEN=986277114, pp. 1-6.
Master Dissertation, University of Electronic Science and Technology of China, 2007, pp. 0-35 and pp. 36-81 (includes English abstract).
China Academic Journal Electronic Publishing House, 1994-2010, pp. 0-30 and pp. 31-66 (includes English abstract).
Furber, "Future Trends In SOC Interconnect", Aug. 2005, IEEE VLSI-TSA International Symposium on VLSI Design, Automation and Test, (VLSI-TSA-DAT 2005) Aug. 2005, pp. 295-298, IEEE, Digital Object Identifier: 10.1109/VDAT.2005.1500079, USA.
Wikipedia, "Parallel Computing", Wikipedia [online], URL: http://en.wikipedia.org/wiki/Parallel_computing, Jan. 19, 2007, pp. 1-6, USA.
Pande et al., "Performance Evaluation and Design Trade-Offs for Network-on-Chip Interconnect Architectures", IEEE Transactions on Computers, vol. 54, No. 8, Aug. 2005, pp. 1025-1040, IEEE Computer Society, USA.
Radulescu et al., "An Efficient On-Chip Network Interface Offering Guaranteed Services, Shared-Memory Abstraction, and Flexible Network Configuration", from Proceedings of the Design, Automation and Test in Europe Conference and Exhibition (DATE'04), held in Paris, France Feb. 2004, pp. 878-883, vol. 2, IEEE Computer Society, USA.
Mereu, "Conception, Analysis, Design and Realization of a Multi-socket Network-on-Chip Architecture and of the Binary Translation support for VLIW core targeted to Systems-on-Chip", Mar. 2007, 145 pages, accessible at http://www.diee.unica.it/driei/tesi/19_mereu.pdf.
Samman et al., "Networks-On-Chip Based on Dynamic Wormhole Packet Identity Mapping Management", VLSI Design, Aug. 7, 2008, 15 pp., vol. 2009, Article ID 941701, Hindawi Publishing Corporation, USA.
Kavaldjiev et al., "A Virtual Channel Network-on-Chip for GT and BE Traffic", from Proceedings of the 2006 Emerging VLSI Technologies and Architectures (ISVLSI'06), held Mar. 2-3, 2006 in Karlsruhe, Germany, pp. 211-216, IEEE Computer Society, USA.
Al-Hashimi, "System-On-Chip—Net Generation Electronics", Asynchronous On-Chip Networks, (month unknown) 2006, Chapter 18, pp. 1-32.
Notice of Allowance, U.S. Appl. No. 12/029,647, Feb. 25, 2011, pp. 1-17.
Office Action, U.S. Appl. No. 12/118,315, Jul. 26, 2011, pp. 1-43.
Notice of Allowance, U.S. Appl. No. 12/015,975, Apr. 15, 2011, pp. 1-14.
Notice of Allowance, U.S. Appl. No. 12/118,272, Mar. 22, 2011, pp. 1-14.
Office Action, U.S. Appl. No. 11/938,376, Oct. 18, 2011, pp. 1-44.
Notice of Allowance, U.S. Appl. No. 12/108,846, May 13, 2011, pp. 1-12.
Notice of Allowance, U.S. Appl. No. 12/117,875, Jan. 27, 2011, pp. 1-10.
Notice of Allowance, U.S. Appl. No. 12/117,897, May 4, 2011, pp. 1-21.
Office Action, U.S. Appl. No. 12/113,286, Oct. 14, 2010, pp. 1-19.
Notice of Allowance, U.S. Appl. No. 12/121,168, Mar. 22, 2011, pp. 1-16.
Notice of Allowance, U.S. Appl. No. 12/121,168, Sep. 9, 2011, pp. 1-7.
Final Office Action, U.S. Appl. No. 11/936,873, Dec. 30, 2011, pp. 1-42.
David Taylor, et al. "System on Chip Packet Processor for an Experimental Network Service Platform". 2003.
Office Action Dated Mar. 30, 2010 in U.S. Appl. No. 11/926,212.
Final Office Action Dated May 19, 2010 in U.S. Appl. No. 11/945,396.
Intel, E8870 Chipset, Intel, Jun. 2002, pp. 1-10.
Office Action Dated Apr. 2, 2010 in U.S. Appl. No. 11/955,553.
Kumar, et al. "A Network on Chip Architecture and Design Methodology". Published 2002, pp. 1-8, ISBN 0-7695-1486-03/02 by IEEE.
Bolotin, et al. "The Power of Priority: NoC based Distributed Cache Coherency". Published May 21, 2007, pp. 117-126, ISBN 0-7695-2773-06/07 by IEEE.
Office Action Dated Mar. 24, 2010 in U.S. Appl. No. 12/031,733.
Virtanen, et al. "NoC Interface for a Protocol Processor". University of Turku.
Walter, et al., "BENoC: A Bus-Enhanced Network on-Chip". Dec. 2007, Technion, Israel Institute of Technology, Haifa, Israel.
Office Action Dated Jun. 8, 2010 in U.S. Appl. No. 12/118,298.
Office Action Dated May 26, 2010 in U.S. Appl. No. 12/117,875.
Final Office Action, U.S. Appl. No. 11/926,212, May 17, 2011.
Kumar et al.; "A Network on Chip Architecture and Design Methodology";2002; IEEE.
Final Office Action, U.S. Appl. No. 11/945,396, Sep. 1, 2011.
Final Office Action, U.S. Appl. No. 11/972,753, Sep. 7, 2011.
Office Action, U.S. Appl. No. 12/135,364, Aug. 5, 2011.
Office Action, U.S. Appl. No. 12/102,033, Oct. 7, 2011.
Office Action, U.S. Appl. No. 11/937,579, Aug. 15, 2011.
Office Action, U.S. Appl. No. 12/233,180, Oct. 6, 2011.
Office Action, U.S. Appl. No. 12/121,222, Sep. 20, 2011.
Final Office Action, U.S. Appl. No. 12/108,770, Sep. 30, 2011.
Bolotin, et al., The Power of Priority:NoC based Distributed Cache Coherency, May 21, 2007, IEEE, pp. 117-126.
Huneycutt et al. "Software Caching using Dynamic Binary Rewriting for Embedded Devices", 2001, Proceedings of the International Conference on Parallel Processing, 10 pages.
Cifuentes et al. "Walkabout—A Retargetable Dynamic Binary Translation Framework", Sun Microsystems Laboratories, Jan. 2002, 13 pages.
Issenin et al.; (Date Reuse Driven Memory and network-on-Chip Co-Synthesis); NSF; pp. 1-7.
Kavaldijev et al. ("Providing QOS Guaranteed in a NOC by Virtual Channel Reservation"); 2006; pp. 1-12.
Monchiero ("Exploration of Distributed Shared Memory Architecture of NOC-Based Microprocessors", 2007) pp. 1-8.
Final Office Action, U.S. Appl. No. 11/926,212, Aug. 23, 2010.
Final Office Action, U.S. Appl. No. 11/955,553, Sep. 13, 2010.
Final Office Action, U.S. Appl. No. 12/031,733, Aug. 19, 2010.
Notice of Allowance, U.S. Appl. No. 12/118,298, Aug. 18, 2010.
Office Action, U.S. Appl. No. 11/972,753, Oct. 4, 2010.
Office Action, U.S. Appl. No. 12/015,975, Jul. 22, 2010.
Office Action, U.S. Appl. No. 11/937,579, Sep. 16, 2010.
Office Action, U.S. Appl. No. 12/118,059, Sep. 1, 2010.
Office Action, U.S. Appl. No. 12/121,168, Oct. 5, 2010.
Final Office Action, U.S. Appl. No. 11/972,753, Feb. 18, 2011.
Final Office Action, U.S. Appl. No. 12/015,975, Jan. 7, 2011.
Final Office Action, U.S. Appl. No. 12/108,846, Feb. 17, 2011.
Final Office Action, U.S. Appl. No. 12/113,286, Feb. 18, 2011.
Final Office Action, U.S. Appl. No. 12/118,059, Feb. 17, 2011.
Office Action, U.S. Appl. No. 11/926,212, Dec. 7, 2010.
Office Action, U.S. Appl. No. 11/945,396, Dec. 9, 2010.
Notice of Allowance, U.S. Appl. No. 11/955,553, Nov. 22, 2010.
Notice of Allowance, U.S. Appl. No. 12/031,733, Nov. 16, 2010.
Office Action, U.S. Appl. No. 12/118,017, Dec. 8, 2010.
Office Action, U.S. Appl. No. 12/118,272, Dec. 2, 2010.
Office Action, U.S. Appl. No. 12/108,846, Dec. 2, 2010.
Final Office Action, U.S. Appl. No. 12/117,875, Nov. 10, 2010.
Office Action, U.S. Appl. No. 12/117,906, May 9, 2008.
Office Action, U.S. Appl. No. 12/060,559, Nov. 3, 2010.
Advisory Action, U.S. Appl. No. 11/926,212, Nov. 2, 2010.
U.S. Appl. No. 12/117,897, filed May 9, 2008, Hoover, et al.
U.S. Appl. No. 12/031,733, filed Feb. 15, 2008, Hoover, et al.
U.S. Appl. No. 12/108,846, filed Apr. 24, 2008, Kuesel, et al.
U.S. Appl. No. 12/108,770, filed Apr. 24, 2008, Mejdrich, et al.
U.S. Appl. No. 12/029,647, filed Feb. 12, 2008, Hoover, et al.
U.S. Appl. No. 12/118,017, filed May 9, 2008, Comparan, et al.
U.S. Appl. No. 12/118,059, filed May 9, 2008, Mejdrich, et al.
U.S. Appl. No. 12/117,875, filed May 9, 2008, Hoover, et al.
U.S. Appl. No. 12/121,222, filed May 15, 2008, Kriegel, et al.
U.S. Appl. No. 11/936,873, filed Nov. 8, 2007, Hoover, et al.
U.S. Appl. No. 12/135,364, filed Jun. 9, 2008, Hoover, et al.
U.S. Appl. No. 11/937,579, filed Nov. 9, 2007, Mejdrich, et al.
U.S. Appl. No. 12/102,033, filed Apr. 14, 2008, Heil, et al.
U.S. Appl. No. 12/118,272, filed May 9, 2008, Kuesel, et al.
U.S. Appl. No. 12/118,039, filed May 9, 2008, Hoover, et al.
U.S. Appl. No. 11/945,396, filed Nov. 27, 2007, Hoover, et al.
U.S. Appl. No. 12/015,975, filed Jan. 17, 2008, Comparan, et al.
U.S. Appl. No. 12/117,906, filed May 9, 2008, Hoover, et al.
U.S. Appl. No. 12/233,180, filed Sep. 9, 2008, Hoover, et al.
U.S. Appl. No. 12/113,286, filed May 1, 2008, Heil, et al.
U.S. Appl. No. 11/955,553, filed Dec. 13, 2007, Comparan, et al.
U.S. Appl. No. 12/031,738, filed Feb. 15, 2008, Hoover, et al.
U.S. Appl. No. 11/972,753, filed Jan. 11, 2008, Mejdrich, et al.
U.S. Appl. No. 12/060,559, filed Apr. 1, 2008, Comparan, et al.
U.S. Appl. No. 11/926,212, filed Oct. 29, 2007, Hoover, et al.
U.S. Appl. No. 12/118,298, filed May 9, 2008, Heil, et al.
U.S. Appl. No. 12/118,315, filed May 9, 2008, Mejdrich, et al.
U.S. Appl. No. 11/938,376, filed Nov. 12, 2007, Mejdrich, et al.
U.S. Appl. No. 12/121,168, filed May 15, 2008, Hoover, et al.
Office Action Dated Jul. 20, 2009 in U.S. Appl. No. 12/031,733.
Kuskin, et al.; The Stanford Flash Multiprocessor; Jun. 6, 1996; Stanford University.
Office Action Dated Jan. 29, 2010 in U.S. Appl. No. 11/945,396.
Final Office Action Dated Jan. 15, 2010 in U.S. Appl. No. 12/031,733.
Office Action, U.S. Appl. No. 11/936,873, Jul. 21, 2011.
Office Action, U.S. Appl. No. 12/031,738, Jul. 11, 2011.
Final Office Action, U.S. Appl. No. 12/060,559, Jul. 8, 2011.

* cited by examiner

IP Block 104
RAM 128
Processor 126
I/O 124
Interconnect 107
462
460
145
146
Memory Communications Controller 106
Memory Communications Execution Engines 140
122
144
120-A
Network Interface Controller 108
Instruction Conversion Logic 136
Virtual Channel Implementation Logic 138
142
121
123
Router 110
Routing Logic 130
Virtual Channel Control Logic 132
Virtual Channel Buffers 134
120-D
120-B
120-C
120
Router 110
106
107
108
Network On Chip ('NOC') 102

CONTEXT SWITCHING IN A NETWORK ON CHIP BY THREAD SAVING AND RESTORING POINTERS TO MEMORY ARRAYS CONTAINING VALID MESSAGE DATA

BACKGROUND OF THE INVENTION

1. Field of the Invention

The field of the invention is data processing, or, more specifically apparatus and methods for data processing with a network on chip ('NOC').

2. Description of Related Art

There are two widely used paradigms of data processing; multiple instructions, multiple data ('MIMD') and single instruction, multiple data ('SIMD'). In MIMD processing, a computer program is typically characterized as one or more threads of execution operating more or less independently, each requiring fast random access to large quantities of shared memory. MIMD is a data processing paradigm optimized for the particular classes of programs that fit it, including, for example, word processors, spreadsheets, database managers, many forms of telecommunications such as browsers, for example, and so on.

SIMD is characterized by a single program running simultaneously in parallel on many processors, each instance of the program operating in the same way but on separate items of data. SIMD is a data processing paradigm that is optimized for the particular classes of applications that fit it, including, for example, many forms of digital signal processing, vector processing, and so on.

There is another class of applications, however, including many real-world simulation programs, for example, for which neither pure SIMD nor pure MIMD data processing is optimized. That class of applications includes applications that benefit from parallel processing and also require fast random access to shared memory. For that class of programs, a pure MIMD system will not provide a high degree of parallelism and a pure SIMD system will not provide fast random access to main memory stores.

SUMMARY OF THE INVENTION

Methods and apparatus for data processing on a network on chip ('NOC') that includes IP blocks, routers, memory communications controllers, and network interface controllers, with each IP block adapted to a router through a memory communications controller and a network interface controller, where each memory communications controller controls communication between an IP block and memory, each network interface controller controls inter-IP block communications through routers, with each IP block also adapted to the network by a low latency, high bandwidth application messaging interconnect including an inbox and an outbox, one or more IP block including a processor supporting a plurality of threads of execution, where the NOC also includes an inbox controller configured to set pointers to the inbox that identify valid message data for a current thread of execution running on a particular processor and an outbox controller configured to set pointers to the outbox that identify valid message data for the current thread of execution running on the particular processor, and software running in the current thread of execution that, upon a context switch to a new thread of execution, is configured to: save the pointer values for the current thread of execution, and reset the pointer values to identify valid message data for the new thread, with the inbox and outbox controller also configured to retain the valid message data for the current thread in the inbox and outbox until context switches again to the current thread.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
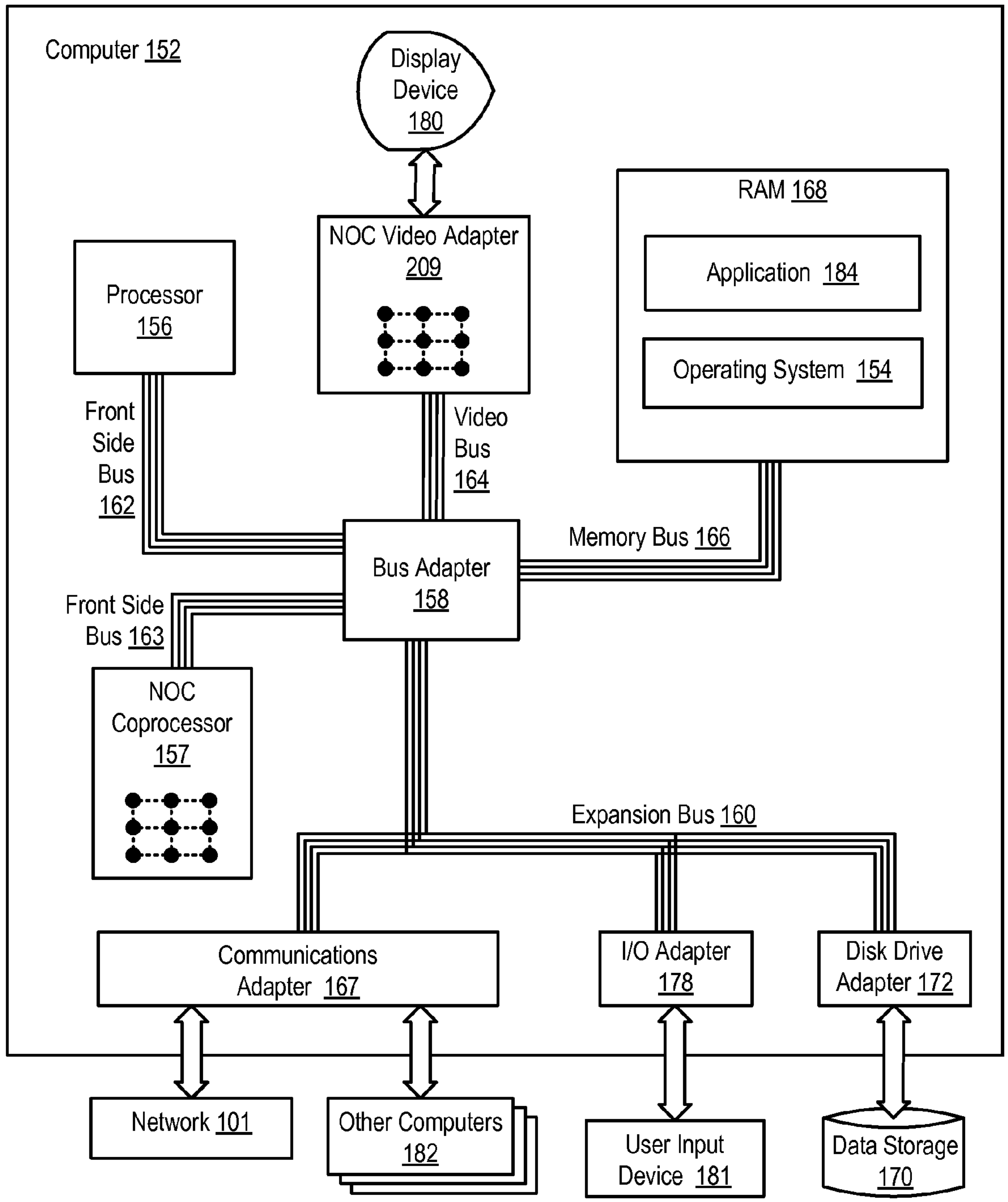
FIG. 1 sets forth a block diagram of automated computing machinery comprising an exemplary computer useful in data processing with a NOC according to embodiments of the present invention.

Exemplary apparatus and methods for data processing with a NOC in accordance with the present invention are described with reference to the accompanying drawings, beginning with FIG. 1. FIG. 1 sets forth a block diagram of automated computing machinery comprising an exemplary computer (152) useful in data processing with a NOC according to embodiments of the present invention. The computer (152) of FIG. 1 includes at least one computer processor (156) or 'CPU' as well as random access memory (168) ('RAM') which is connected through a high speed memory bus (166) and bus adapter (158) to processor (156) and to other components of the computer (152).

Stored in RAM (168) is an application program (184), a module of user-level computer program instructions for carrying out particular data processing tasks such as, for example, word processing, spreadsheets, database operations, video gaming, stock market simulations, atomic quantum process simulations, or other user-level applications. Also stored in RAM (168) is an operating system (154). Operating systems useful data processing with a NOC according to embodiments of the present invention include UNIX™, Linux™, Microsoft XP™, AIX™, IBM's i5/OS™, and others as will occur to those of skill in the art. The operating system (154) and the application (184) in the example of FIG. 1 are shown in RAM (168), but many components of such software typically are stored in non-volatile memory also, such as, for example, on a disk drive (170).

The example computer (152) includes two example NOCs according to embodiments of the present invention: a video adapter (209) and a coprocessor (157). The video adapter (209) is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The example NOC coprocessor (157) is connected to processor (156) through bus adapter (158), and front side buses (162 and 163), which is also a high speed bus. The NOC coprocessor of FIG. 1 is optimized to accelerate particular data processing tasks at the behest of the main processor (156). The NOC video adapter and the NOC coprocessor are optimized for programs that use parallel processing and also require fast random access to shared memory. The details of the NOC structure and operation are discussed below with reference to FIGS. 2-6.

The example NOC video adapter (209) and NOC coprocessor (157) of FIG. 1 each include a NOC according to embodiments of the present invention, including integrated processor ('IP') blocks, routers, memory communications controllers, and network interface controllers, each IP block adapted to a router through a memory communications controller and a network interface controller, each memory communications controller controlling communication between an IP block and memory, and each network interface controller controlling inter-IP block communications through routers. Each IP block is also adapted to the network by a low latency, high bandwidth application messaging interconnect comprising an inbox and an outbox. Each IP block also includes a processor supporting a plurality of threads of execution. Each NOC also includes an inbox controller configured to set pointers to the inbox that identify valid message data for a current thread of execution running on a particular processor; an outbox controller configured to set pointers to the outbox that identify valid message data for the current thread of execution running on a particular processor; and software running in the current thread of execution that, upon a context switch to a new thread of execution, is configured to: save the pointer values for the current thread of execution, and reset the pointer values to identify valid message data for the new thread, where the inbox and outbox controller further configured to retain the valid message data for the current thread in the inbox and outbox until context switches again to the current thread.

The computer (152) of FIG. 1 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers for data processing with a NOC according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice.

The exemplary computer (152) of FIG. 1 includes a communications adapter (167) for data communications with other computers (182) and for data communications with a data communications network (100). Such data communications may be carried out serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters useful for data processing with a NOC according to embodiments of the present invention include modems for wired dial-up communications, Ethernet (IEEE 802.3) adapters for wired data communications network communications, and 802.11 adapters for wireless data communications network communications.

Figure 2:
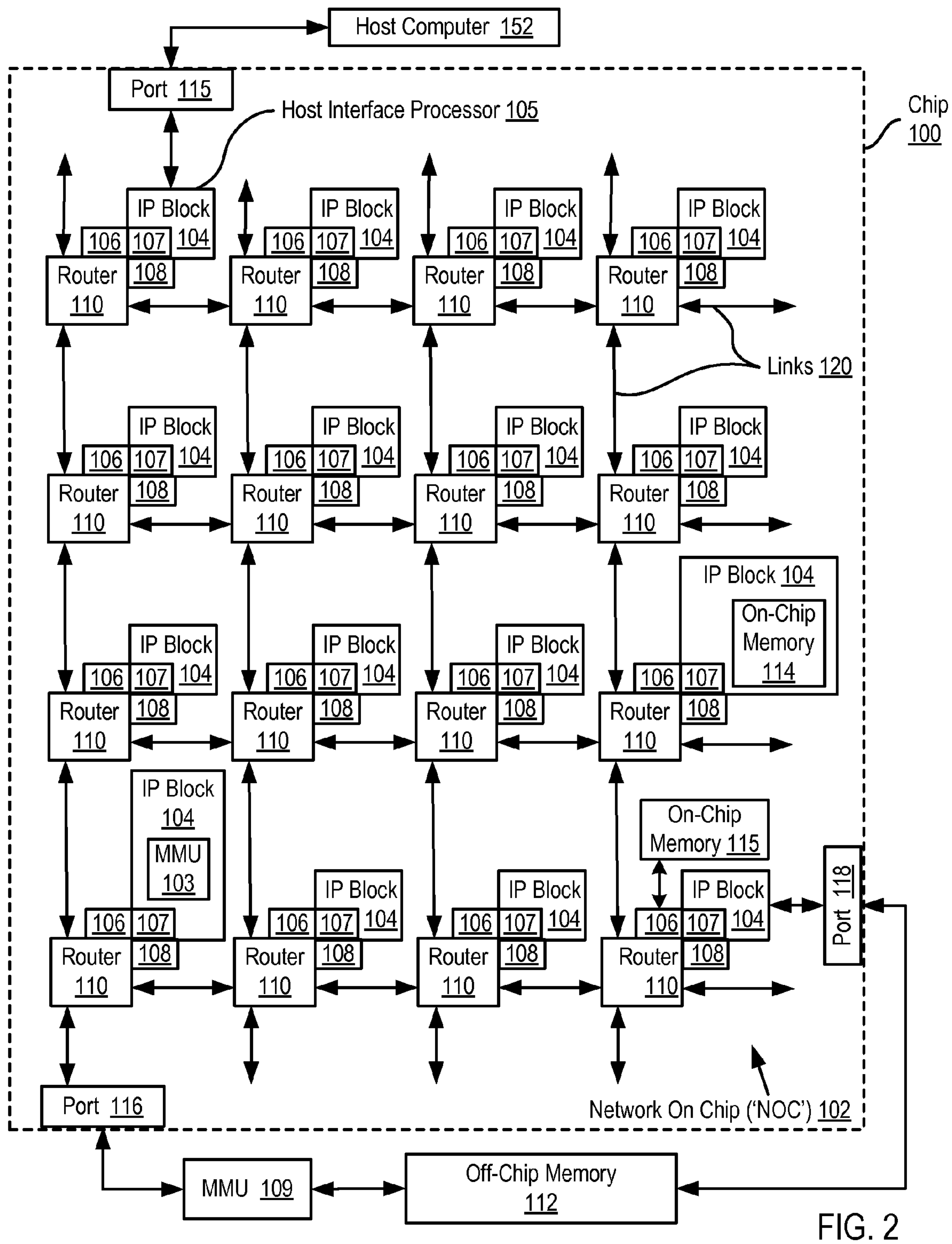
FIG. 2 sets forth a functional block diagram of an example NOC according to embodiments of the present invention.

For further explanation, FIG. 2 sets forth a functional block diagram of an example NOC (102) according to embodiments of the present invention. The NOC in the example of FIG. 2 is implemented on a 'chip' (100), that is, on an integrated circuit. The NOC (102) of FIG. 2 includes integrated processor ('IP') blocks (104), routers (110), memory communications controllers (106), and network interface controllers (108). Each IP block (104) is adapted to a router (110) through a memory communications controller (106) and a network interface controller (108). Each memory communications controller controls communications between an IP block and memory, and each network interface controller (108) controls inter-IP block communications through routers (110).

In the NOC (102) of FIG. 2, each IP block represents a reusable unit of synchronous or asynchronous logic design used as a building block for data processing within the NOC. The term 'IP block' is sometimes expanded as 'intellectual property block,' effectively designating an IP block as a design that is owned by a party, that is the intellectual property of a party, to be licensed to other users or designers of semiconductor circuits. In the scope of the present invention, however, there is no requirement that IP blocks be subject to any particular ownership, so the term is always expanded in this specification as 'integrated processor block.' IP blocks, as specified here, are reusable units of logic, cell, or chip layout design that may or may not be the subject of intellectual property. IP blocks are logic cores that can be formed as ASIC chip designs or FPGA logic designs.

One way to describe IP blocks by analogy is that IP blocks are for NOC design what a library is for computer programming or a discrete integrated circuit component is for printed circuit board design. In NOCs according to embodiments of the present invention, IP blocks may be implemented as generic gate netlists, as complete special purpose or general purpose microprocessors, or in other ways as may occur to those of skill in the art. A netlist is a Boolean-algebra representation (gates, standard cells) of an IP block's logical-function, analogous to an assembly-code listing for a high-level program application. NOCs also may be implemented, for example, in synthesizable form, described in a hardware description language such as Verilog or VHDL. In addition to netlist and synthesizable implementation, NOCs also may be delivered in lower-level, physical descriptions. Analog IP block elements such as SERDES, PLL, DAC, ADC, and so on, may be distributed in a transistor-layout format such as GDSII. Digital elements of IP blocks are sometimes offered in layout format as well.

In the example of FIG. 2, each IP block includes a low latency, high bandwidth application messaging interconnect (107) that adapts the IP block to the network for purposes of data communications among IP blocks. As described in more detail below, each such messaging interconnect includes an inbox and an outbox. In addition, each IP block also includes a processor supporting a plurality of threads of execution. The NOC (102) also includes an inbox controller configured to set pointers to the inbox that identify valid message data for a current thread of execution running on a particular processor; an outbox controller configured to set pointers to the outbox that identify valid message data for the current thread of execution running on a particular processor; and software running in the current thread of execution that, upon a context switch to a new thread of execution, is configured to: save the pointer values for the current thread of execution, and reset the pointer values to identify valid message data for the new thread, where the inbox and outbox controller further configured to retain the valid message data for the current thread in the inbox and outbox until context switches again to the current thread.

Each IP block (104) in the example of FIG. 2 is adapted to a router (110) through a memory communications controller (106). Each memory communication controller is an aggregation of synchronous and asynchronous logic circuitry adapted to provide data communications between an IP block and memory. Examples of such communications between IP blocks and memory include memory load instructions and memory store instructions. The memory communications controllers (106) are described in more detail below with reference to FIG. 3.

Each IP block (104) in the example of FIG. 2 is also adapted to a router (110) through a network interface controller (108). Each network interface controller (108) controls communications through routers (110) between IP blocks (104). Examples of communications between IP blocks include messages carrying data and instructions for processing the data among IP blocks in parallel applications and in pipelined applications. The network interface controllers (108) are described in more detail below with reference to FIG. 3.

Each IP block (104) in the example of FIG. 2 is adapted to a router (110). The routers (110) and links (120) among the routers implement the network operations of the NOC. The links (120) are packets structures implemented on physical, parallel wire buses connecting all the routers. That is, each link is implemented on a wire bus wide enough to accommodate simultaneously an entire data switching packet, including all header information and payload data. If a packet structure includes 64 bytes, for example, including an eight byte header and 56 bytes of payload data, then the wire bus subtending each link is 64 bytes wise, 512 wires. In addition, each link is bi-directional, so that if the link packet structure includes 64 bytes, the wire bus actually contains 1024 wires between each router and each of its neighbors in the network. A message can includes more than one packet, but each packet fits precisely onto the width of the wire bus. If the connection between the router and each section of wire bus is referred to as a port, then each router includes five ports, one for each of four directions of data transmission on the network and a fifth port for adapting the router to a particular IP block through a memory communications controller and a network interface controller.

Each memory communications controller (106) in the example of FIG. 2 controls communications between an IP block and memory. Memory can include off-chip main RAM (112), memory (115) connected directly to an IP block through a memory communications controller (106), on-chip memory enabled as an IP block (114), and on-chip caches. In the NOC of FIG. 2, either of the on-chip memories (114, 115), for example, may be implemented as on-chip cache memory. All these forms of memory can be disposed in the same address space, physical addresses or virtual addresses, true even for the memory attached directly to an IP block. Memory-addressed messages therefore can be entirely bidirectional with respect to IP blocks, because such memory can be addressed directly from any IP block anywhere on the network. Memory (114) on an IP block can be addressed from that IP block or from any other IP block in the NOC. Memory (115) attached directly to a memory communication controller can be addressed by the IP block that is adapted to the network by that memory communication controller—and can also be addressed from any other IP block anywhere in the NOC.

The example NOC includes two memory management units ('MMUs') (103, 109), illustrating two alternative memory architectures for NOCs according to embodiments of the present invention. MMU (103) is implemented with an IP block, allowing a processor within the IP block to operate in virtual memory while allowing the entire remaining architecture of the NOC to operate in a physical memory address space. The MMU (109) is implemented off-chip, connected to the NOC through a data communications port (116). The port (116) includes the pins and other interconnections required to conduct signals between the NOC and the MMU, as well as sufficient intelligence to convert message packets from the NOC packet format to the bus format required by the external MMU (109). The external location of the MMU means that all processors in all IP blocks of the NOC can operate in virtual memory address space, with all conversions to physical addresses of the off-chip memory handled by the off-chip MMU (109).

In addition to the two memory architectures illustrated by use of the MMUs (103, 109), data communications port (118) illustrates a third memory architecture useful in NOCs according to embodiments of the present invention. Port (118) provides a direct connection between an IP block (104) of the NOC (102) and off-chip memory (112). With no MMU in the processing path, this architecture provides utilization of a physical address space by all the IP blocks of the NOC. In sharing the address space bi-directionally, all the IP blocks of the NOC can access memory in the address space by memory-addressed messages, including loads and stores, directed through the IP block connected directly to the port (118). The port (118) includes the pins and other interconnections required to conduct signals between the NOC and the off-chip memory (112), as well as sufficient intelligence to convert message packets from the NOC packet format to the bus format required by the off-chip memory (112).

In the example of FIG. 2, one of the IP blocks is designated a host interface processor (105). A host interface processor (105) provides an interface between the NOC and a host computer (152) in which the NOC may be installed and also provides data processing services to the other IP blocks on the NOC, including, for example, receiving and dispatching among the IP blocks of the NOC data processing requests from the host computer. A NOC may, for example, implement a video graphics adapter (209) or a coprocessor (157) on a larger computer (152) as described above with reference to FIG. 1. In the example of FIG. 2, the host interface processor (105) is connected to the larger host computer through a data communications port (115). The port (115) includes the pins and other interconnections required to conduct signals between the NOC and the host computer, as well as sufficient intelligence to convert message packets from the NOC to the bus format required by the host computer (152). In the example of the NOC coprocessor in the computer of FIG. 1, such a port would provide data communications format translation between the link structure of the NOC coprocessor (157) and the protocol required for the front side bus (163) between the NOC coprocessor (157) and the bus adapter (158).

Figure 3:
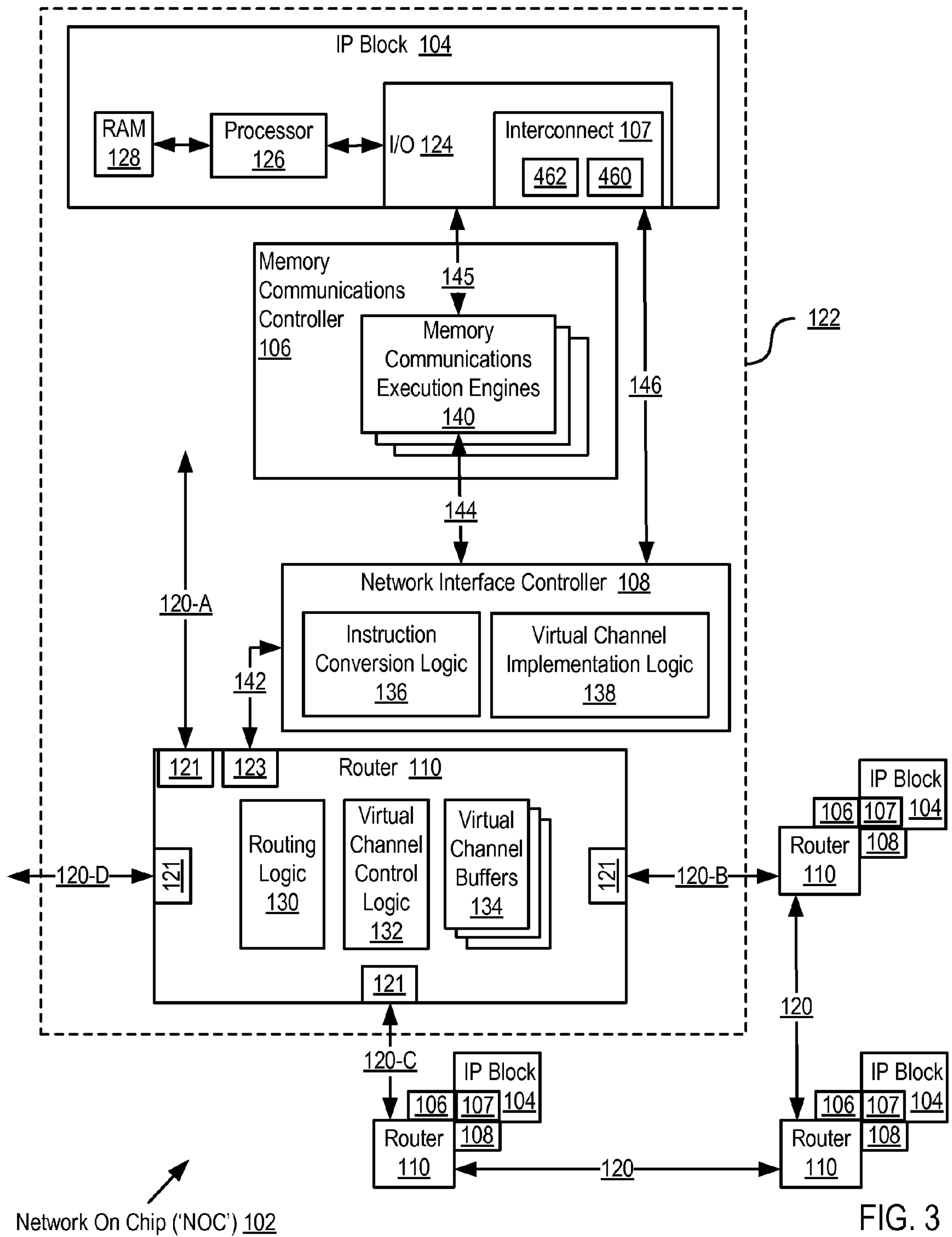
FIG. 3 sets forth a functional block diagram of a further example NOC according to embodiments of the present invention.

For further explanation, FIG. 3 sets forth a functional block diagram of a further example NOC according to embodiments of the present invention. The example NOC of FIG. 3 is similar to the example NOC of FIG. 2 in that the example NOC of FIG. 3 is implemented on a chip (100 on FIG. 2), and the NOC (102) of FIG. 3 includes integrated processor ('IP') blocks (104), routers (110), memory communications controllers (106), and network interface controllers (108). Each IP block (104) is adapted to a router (110) through a memory communications controller (106) and a network interface controller (108). Each memory communications controller controls communications between an IP block and memory, and each network interface controller (108) controls inter-IP block communications through routers (110). In the example of FIG. 3, one set (122) of an IP block (104) adapted to a router (110) through a memory communications controller (106) and network interface controller (108) is expanded to aid a more detailed explanation of their structure and operations. All the IP blocks, memory communications controllers, network interface controllers, and routers in the example of FIG. 3 are configured in the same manner as the expanded set (122).

In the example of FIG. 3, each IP block (104) includes a computer processor (126) and I/O functionality (124). In this example, computer memory is represented by a segment of random access memory ('RAM') (128) in each IP block (104). The memory, as described above with reference to the example of FIG. 2, can occupy segments of a physical address space whose contents on each IP block are addressable and accessible from any IP block in the NOC. The processors (126), I/O capabilities (124), and memory (128) on each IP block effectively implement the IP blocks as generally programmable microcomputers. As explained above, however, in the scope of the present invention, IP blocks generally represent reusable units of synchronous or asynchronous logic used as building blocks for data processing within a NOC. Implementing IP blocks as generally programmable microcomputers, therefore, although a common embodiment useful for purposes of explanation, is not a limitation of the present invention.

In the example of FIG. 3, each IP block includes a low latency, high bandwidth application messaging interconnect (107) that adapts the IP block to the network for purposes of data communications among IP blocks. As described in more detail below, each such messaging interconnect includes an inbox (460) and an outbox (462). In addition, each IP block (104) also includes a processor (126) supporting a plurality of threads of execution. The NOC (102) also includes an inbox controller configured to set pointers to the inbox that identify valid message data for a current thread of execution running on a particular processor; an outbox controller configured to set pointers to the outbox that identify valid message data for the current thread of execution running on a particular processor; and software running in the current thread of execution that, upon a context switch to a new thread of execution, is configured to: save the pointer values for the current thread of execution, and reset the pointer values to identify valid message data for the new thread, where the inbox and outbox controller further configured to retain the valid message data for the current thread in the inbox and outbox until context switches again to the current thread.

In the NOC (102) of FIG. 3, each memory communications controller (106) includes a plurality of memory communications execution engines (140). Each memory communications execution engine (140) is enabled to execute memory communications instructions from an IP block (104), including bidirectional memory communications instruction flow (142, 144, 145) between the network and the IP block (104). The memory communications instructions executed by the memory communications controller may originate, not only from the IP block adapted to a router through a particular memory communications controller, but also from any IP block (104) anywhere in the NOC (102). That is, any IP block in the NOC can generate a memory communications instruction and transmit that memory communications instruction through the routers of the NOC to another memory communications controller associated with another IP block for execution of that memory communications instruction. Such memory communications instructions can include, for example, translation lookaside buffer control instructions, cache control instructions, barrier instructions, and memory load and store instructions.

Each memory communications execution engine (140) is enabled to execute a complete memory communications instruction separately and in parallel with other memory communications execution engines. The memory communications execution engines implement a scalable memory transaction processor optimized for concurrent throughput of memory communications instructions. The memory communications controller (106) supports multiple memory communications execution engines (140) all of which run concurrently for simultaneous execution of multiple memory communications instructions. A new memory communications instruction is allocated by the memory communications controller (106) to a memory communications engine (140) and the memory communications execution engines (140) can accept multiple response events simultaneously. In this example, all of the memory communications execution engines (140) are identical. Scaling the number of memory communications instructions that can be handled simultaneously by a memory communications controller (106), therefore, is implemented by scaling the number of memory communications execution engines (140).

In the NOC (102) of FIG. 3, each network interface controller (108) is enabled to convert communications instructions from command format to network packet format for transmission among the IP blocks (104) through routers (110). The communications instructions are formulated in command format by the IP block (104) or by the memory communications controller (106) and provided to the network interface controller (108) in command format. The command format is a native format that conforms to architectural register files of the IP block (104) and the memory communications controller (106). The network packet format is the format required for transmission through routers (110) of the network. Each such message is composed of one or more network packets. Examples of such communications instructions that are converted from command format to packet format in the network interface controller include memory load instructions and memory store instructions between IP blocks and memory. Such communications instructions may also include communications instructions that send messages among IP blocks carrying data and instructions for processing the data among IP blocks in parallel applications and in pipelined applications.

In the NOC (102) of FIG. 3, each IP block is enabled to send memory-address-based communications to and from memory through the IP block's memory communications controller and then also through its network interface controller to the network. A memory-address-based communications is a memory access instruction, such as a load instruction or a store instruction, that is executed by a memory communication execution engine of a memory communications controller of an IP block. Such memory-address-based communications typically originate in an IP block, formulated in command format, and handed off to a memory communications controller for execution.

Many memory-address-based communications are executed with message traffic, because any memory to be accessed may be located anywhere in the physical memory address space, on-chip or off-chip, directly attached to any memory communications controller in the NOC, or ultimately accessed through any IP block of the NOC—regardless of which IP block originated any particular memory-address-based communication. All memory-address-based communication that are executed with message traffic are passed from the memory communications controller to an associated network interface controller for conversion (136) from command format to packet format and transmission through the network in a message. In converting to packet format, the network interface controller also identifies a network address for the packet in dependence upon the memory address or addresses to be accessed by a memory-address-based communication. Memory address based messages are addressed with memory addresses. Each memory address is mapped by the network interface controllers to a network address, typically the network location of a memory communications controller responsible for some range of physical memory addresses. The network location of a memory communication controller (106) is naturally also the network location of that memory communication controller's associated router (110), network interface controller (108), and IP block (104). The instruction conversion logic (136) within each network interface controller is capable of converting memory addresses to network addresses for purposes of transmitting memory-address-based communications through routers of a NOC.

Upon receiving message traffic from routers (110) of the network, each network interface controller (108) inspects each packet for memory instructions. Each packet containing a memory instruction is handed to the memory communications controller (106) associated with the receiving network interface controller, which executes the memory instruction before sending the remaining payload of the packet to the IP block for further processing. In this way, memory contents are always prepared to support data processing by an IP block before the IP block begins execution of instructions from a message that depend upon particular memory content.

In the NOC (102) of FIG. 3, each IP block (104) is enabled to bypass its memory communications controller (106) and send inter-IP block, network-addressed communications (146) directly to the network through the IP block's network interface controller (108). Network-addressed communications are messages directed by a network address to another IP block. Such messages transmit working data in pipelined applications, multiple data for single program processing among IP blocks in a SIMD application, and so on, as will occur to those of skill in the art. Such messages are distinct from memory-address-based communications in that they are network addressed from the start, by the originating IP block which knows the network address to which the message is to be directed through routers of the NOC. Such network-addressed communications are passed by the IP block through it I/O functions (124) directly to the IP block's network interface controller in command format, then converted to packet format by the network interface controller and transmitted through routers of the NOC to another IP block. Such network-addressed communications (146) are bi-directional, potentially proceeding to and from each IP block of the NOC, depending on their use in any particular application. Each network interface controller, however, is enabled to both send and receive (142) such communications to and from an associated router, and each network interface controller is enabled to both send and receive (146) such communications directly to and from an associated IP block, bypassing an associated memory communications controller (106).

Each network interface controller (108) in the example of FIG. 3 is also enabled to implement virtual channels on the network, characterizing network packets by type. Each network interface controller (108) includes virtual channel implementation logic (138) that classifies each communication instruction by type and records the type of instruction in a field of the network packet format before handing off the instruction in packet form to a router (110) for transmission on the NOC. Examples of communication instruction types include inter-IP block network-address-based messages, request messages, responses to request messages, invalidate messages directed to caches; memory load and store messages; and responses to memory load messages, and so on.

Each router (110) in the example of FIG. 3 includes routing logic (130), virtual channel control logic (132), and virtual channel buffers (134). The routing logic typically is implemented as a network of synchronous and asynchronous logic that implements a data communications protocol stack for data communication in the network formed by the routers (110), links (120), and bus wires among the routers. The routing logic (130) includes the functionality that readers of skill in the art might associate in off-chip networks with routing tables, routing tables in at least some embodiments being considered too slow and cumbersome for use in a NOC. Routing logic implemented as a network of synchronous and asynchronous logic can be configured to make routing decisions as fast as a single clock cycle. The routing logic in this example routes packets by selecting a port for forwarding each packet received in a router. Each packet contains a network address to which the packet is to be routed. Each router in this example includes five ports, four ports (121) connected through bus wires (120-A, 120-B, 120-C, 120-D) to other routers and a fifth port (123) connecting each router to its associated IP block (104) through a network interface controller (108) and a memory communications controller (106).

In describing memory-address-based communications above, each memory address was described as mapped by network interface controllers to a network address, a network location of a memory communications controller. The network location of a memory communication controller (106) is naturally also the network location of that memory communication controller's associated router (110), network interface controller (108), and IP block (104). In inter-IP block, or network-address-based communications, therefore, it is also typical for application-level data processing to view network addresses as location of IP block within the network formed by the routers, links, and bus wires of the NOC. FIG. 2 illustrates that one organization of such a network is a mesh of rows and columns in which each network address can be implemented, for example, as either a unique identifier for each set of associated router, IP block, memory communications controller, and network interface controller of the mesh or x,y coordinates of each such set in the mesh.

In the NOC (102) of FIG. 3, each router (110) implements two or more virtual communications channels, where each virtual communications channel is characterized by a communication type. Communication instruction types, and therefore virtual channel types, include those mentioned above: inter-IP block network-address-based messages, request messages, responses to request messages, invalidate messages directed to caches; memory load and store messages; and responses to memory load messages, and so on. In support of virtual channels, each router (110) in the example of FIG. 3 also includes virtual channel control logic (132) and virtual channel buffers (134). The virtual channel control logic (132) examines each received packet for its assigned communications type and places each packet in an outgoing virtual channel buffer for that communications type for transmission through a port to a neighboring router on the NOC.

Each virtual channel buffer (134) has finite storage space. When many packets are received in a short period of time, a virtual channel buffer can fill up—so that no more packets can be put in the buffer. In other protocols, packets arriving on a virtual channel whose buffer is full would be dropped. Each virtual channel buffer (134) in this example, however, is enabled with control signals of the bus wires to advise surrounding routers through the virtual channel control logic to suspend transmission in a virtual channel, that is, suspend transmission of packets of a particular communications type. When one virtual channel is so suspended, all other virtual channels are unaffected—and can continue to operate at full capacity. The control signals are wired all the way back through each router to each router's associated network interface controller (108). Each network interface controller is configured to, upon receipt of such a signal, refuse to accept, from its associated memory communications controller (106) or from its associated IP block (104), communications instructions for the suspended virtual channel. In this way, suspension of a virtual channel affects all the hardware that implements the virtual channel, all the way back up to the originating IP blocks.

One effect of suspending packet transmissions in a virtual channel is that no packets are ever dropped in the architecture of FIG. 3. When a router encounters a situation in which a packet might be dropped in some unreliable protocol such as, for example, the Internet Protocol, the routers in the example of FIG. 3 suspend by their virtual channel buffers (134) and their virtual channel control logic (132) all transmissions of packets in a virtual channel until buffer space is again available, eliminating any need to drop packets. The NOC of FIG. 3, therefore, implements highly reliable network communications protocols with an extremely thin layer of hardware.

Figure 4:
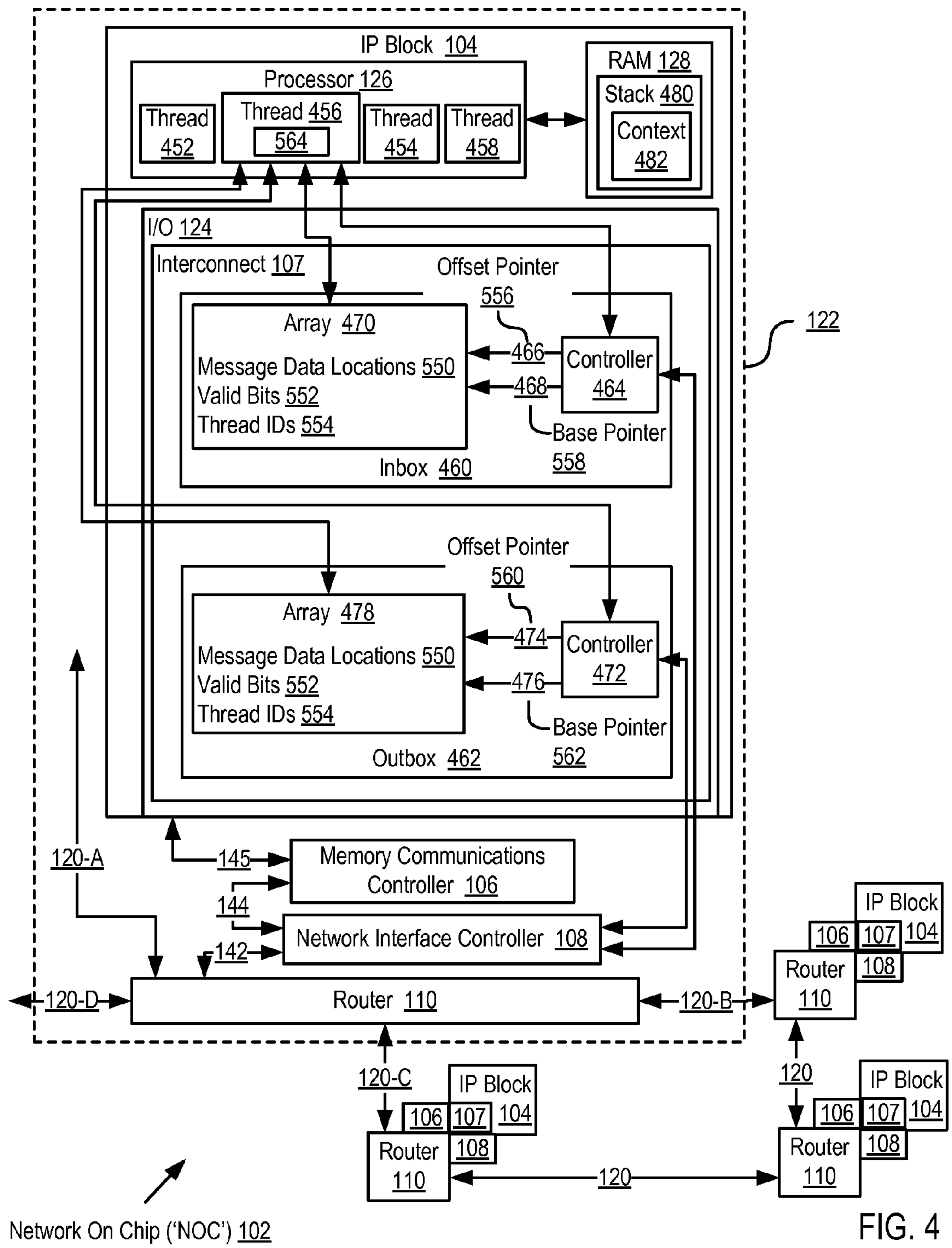
FIG. 4 sets forth a functional block diagram of a further example NOC according to embodiments of the present invention.

For further explanation, FIG. 4 sets forth a functional block diagram of a further example NOC according to embodiments of the present invention. The example NOC of FIG. 4 is similar to the example NOC of FIG. 2 in that the example NOC of FIG. 4 is implemented on a chip (100 on FIG. 2), and the NOC (102) of FIG. 4 includes integrated processor ('IP') blocks (104), routers (110), memory communications controllers (106), and network interface controllers (108). Each IP block (104) is adapted to a router (110) through a memory communications controller (106) and a network interface controller (108). Each memory communications controller controls communications between an IP block and memory, and each network interface controller (108) controls inter-IP block communications through routers (110). Each IP block in this example also includes a processor (126) supporting a plurality of threads of execution (452-458).

In the example of FIG. 4, each IP block includes a low latency, high bandwidth application messaging interconnect (107) that adapts the IP block to the network for purposes of data communications among IP blocks. The low latency, high bandwidth application messaging interconnect (107) is an interconnect in the sense that it is composed of sequential and non-sequential logic that connects an IP block (104) to a network interface controller (108) for purposes of data communications. The low latency, high bandwidth application messaging interconnect (107) is a low latency, high bandwidth interconnect in that it provides a very fast interconnection between the IP block and the network interface controller—so fast because from the point of view of the IP block, for outgoing messages, the process of sending a message to the network interface controller represents a single immediate write to high speed local memory in the outbox array (478), and receiving a message in the IP block (104) from the network interface controller (108) represents a single read operation from a high speed local memory in the inbox array (470). As described in more detail below, each such messaging interconnect (107) includes an inbox (460) and an outbox (462), each controlled by an associated box controller (464, 472). In the example of FIG. 4, one set (122) of an IP block (104) adapted to a router (110) through a memory communications controller (106) and network interface controller (108) is expanded to aid a more detailed explanation of the structure and operations of the messaging interconnect (107). All the IP blocks, memory communications controllers, network interface controllers, and routers in the example of FIG. 4 are configured in the same manner as the expanded set (122).

In the example NOC of FIG. 4, each outbox (462) includes an array (478) of memory indexed by an outbox write pointer (474) and an outbox read pointer (476). Each outbox (462) also includes an outbox message controller (472). In the example NOC of FIG. 4, the outbox has an associated thread of execution (456) that is a module of computer program instructions executing on a processor of the IP block. Each such associated thread of execution (456) is enabled to write message data into the array (478) and to provide to the outbox message controller (472) message control information, including message destination identification and an indication that message data in the array (478) is ready to be sent. The message control information, such as destination address or message identification, and other control information such as 'ready to send,' may be written to registers in the outbox message controller (472) or such information may be written into the array (478) itself as part of the message data, in a message header, message meta-data, or the like.

The outbox message controller (472) is implemented as a network of sequential and non-sequential logic that is enabled to set the outbox write pointer (474). The outbox write pointer (474) may be implemented, for example, as a register in the outbox message controller (472) that stores the memory address of the location in the array where the associated thread of execution is authorized to write message data. The outbox message controller (472) is also enabled to set the outbox read pointer (476). The outbox read pointer (476) may be implemented, for example, as a register in the outbox message controller (472) that stores the memory address of the location in the array where the outbox message controller is to read its next message data for transmission over the network from the outbox.

The outbox message controller (472) is also enabled to send to the network message data written into the array (478) by the thread of execution (458) associated with the outbox (462). In the NOC (102) of FIG. 4, each network interface controller (108) is enabled to convert communications instructions from command format to network packet format for transmission among the IP blocks (104) through routers (110). The communications instructions are formulated in command format by the associated thread of execution (458) in the IP block (104) and provided by the outbox message controller (472) to the network interface controller (108) in command format. The command format is a native format that conforms to architectural register files of the IP block (104) and the outbox message controller (472). The network packet format is the format required for transmission through routers (110) of the network. Each such message is composed of one or more network packets. Such communications instructions may include, for example, communications instructions that send messages among IP blocks carrying data and instructions for processing the data among IP blocks in parallel applications and in pipelined applications.

In the example NOC of FIG. 4, each inbox (460) includes an array (470) of memory indexed by an inbox write pointer (466) and an inbox read pointer (468). Each inbox (460) also includes an inbox message controller (464). The inbox message controller (464) is implemented as a network of sequential and non-sequential logic that is enabled to set the inbox write pointer (466). The inbox write pointer (466) may be implemented, for example, as a register in the inbox message controller (464) that stores the memory address of the beginning location in the array (470) where message data from an outbox of another IP block is to be written. The inbox message controller (464) is also enabled to set the inbox read pointer (468). The inbox read pointer (468) may be implemented, for example, as a register in the inbox message controller (464) that stores the memory address of the beginning location in the array (470) where an associated thread of execution (456) may read the next message received from an outbox of some other IP block.

In the example NOC of FIG. 4, the inbox has an associated thread of execution (456) that is a module of computer program instructions executing on a processor of the IP block. Each such associated thread of execution (456) is enabled to read from the array message data sent from some other outbox of another IP block. The thread of execution may be notified that message data sent from another outbox of another IP block has been written into the array by the message controller through a flag set in a status register, for example.

The inbox message controller (464) is also enabled to receive from the network message data written to the network from an outbox of another IP block and provide to a thread of execution (456) associated with the inbox (460) the message data received from the network. The inbox message controller of FIG. 4 receives from a network interface controller (108) message data from an outbox of some other IP block and writes the received message data to the array (470). Upon writing the received message data to the array, the inbox message controller (464) is also enabled to notify the thread of execution (456) associated with the inbox that message data has been received from the network by, for example, setting a data-ready flag in a status register of the inbox message controller (464). The associated thread of execution may, for example, 'sleep until flag' before a message load, or a load opcode can be configured to check a data-ready flag in the inbox message controller.

In the example NOC of FIG. 4, each box controller (464, 472) is configured to set pointers to its associated inbox or outbox that identify valid message data for a current thread of execution running on a particular processor. Valid message data is message data in an inbox not yet read by its recipient and message data in an outbox not yet delivered to its recipient. A 'current' thread of execution is a thread of execution running on a particular processor before a context switch. By contrast, a 'new' thread of execution is a thread of execution that runs on the same particular processor after the context switch. The 'current' thread of execution, after a context switch in which a new thread of execution runs on the particular processor, may be referred to as the sleeping thread.

A context switch is the computing process of storing and restoring the context for a thread on a processor such that multiple threads of execution can share a single processor. The context switch is a typical feature of a multitasking NOC according to embodiments of the present invention. A context switch among two or more threads of execution is typically implemented by storing the context (482) of the thread (456) presently in possession of a processor in a stack (480), replacing the stored context in the architectural registers of the processor with the previously-stored context of another thread (including the new thread's instruction pointer), and continuing at the point in program execution indicated by the new thread's instruction pointer value. The context for a thread of execution may include the contents of one or more of the architectural registers currently used for program execution by the thread. Examples of such architectural registers include, for example, an instruction pointer, status flag registers, one or more stack pointers, memory address indexing registers, one or more general purpose registers, and so on.

Upon a context switch, context for a thread is typically stored in a stack (480). The stack (480) is shown here as a segment of RAM (128) on an IP block, illustrating the fact that the stack is implemented as a segment of main memory, which in this architecture can be, not just on the same IP block, but anywhere in the NOC's hardware memory address space, physically associated with the subject IP block, some other IP block, this router or another router, on or off the NOC.

Pointers to the inbox and outbox that identify valid message data for a current thread of execution running on a particular processor are referred to in this specification as a base pointer and an offset pointer for a thread of execution. A base pointer for a thread defines the beginning of a portion of an inbox or outbox memory array containing valid message data for the thread. An offset pointer for the thread defines the extent of the portion of the memory array containing valid message data for the thread. The portion of the memory array containing valid message data for the current thread (456) may include message data retained from one or more previous context switches for another thread of execution. Each thread, whether currently executing or sleeping, may have associated base and offset pointers. Such pointers may be implemented and used during execution of a current thread by the box controllers (464) as read (468, 476) and write (466,474) pointers for an inbox (460) and outbox (462) as described above. That is, a base pointer (558) for an inbox (460), implemented as an inbox read pointer (468), may be, for example, a register in the inbox message controller (464) that stores the memory address of the beginning message data location (550) in an array (470) where an associated thread of execution (456) may read the next message received from an outbox of some other IP block. An offset pointer (556) for an inbox (460), implemented as an inbox write pointer (466), may be, for example, a register in the inbox message controller (464) that stores the memory address of the beginning message data location (550) in the array (470) where message data from an outbox of another IP block is to be written. A base pointer (562) for an outbox (462), implemented as an outbox read pointer (476), may be, for example, a register in the outbox message controller (472) that stores the memory address of the message data location (550) in the array (478) where the outbox message controller (472) is to read its next message data for transmission over the network from the outbox (462).

And an offset pointer (560) for an outbox (462), implemented as a outbox write pointer (474), may be, for example, a register in the outbox message controller (472) that stores the memory address of the message data location (550) in the array (478) where the associated thread (456) of execution is authorized to write message data.

In the example NOC of FIG. 4, the current thread of execution (456) includes software (564) running in the thread. Upon a context switch to a new thread of execution, the software (564) running the current thread is configured to save the pointer values for the current thread of execution, that is, values of a base and offset pointer for the current thread, and reset the pointer values to identify valid message data for the new thread. The software (564) may save the pointer values for the current thread of execution by retrieving from the box controllers, or architectural registers associated with box controllers, the current values of the boxes' read and write pointers and storing the values in association with a thread identification of the current thread in memory, such as RAM (128). The software (564) may reset the pointer values to identify valid message data for the new thread by setting the pointer values for the new thread to point to the origin of the memory array if the new thread has not run previously on the particular processor and restoring the pointer values for the new thread from memory if the new thread was run previously on the particular processor before a prior context switch.

The box controllers (464, 474) in the example NOC of FIG. 4 are configured to retain valid message data for the current thread (456) in the inbox and outbox until context switches again to the current thread. That is, during execution of the 'new' thread, such as, for example, thread (452) in the example of FIG. 4, the new thread may store message data in and read message data from an array (470, 478) without affecting valid message data of a sleeping thread also stored in the same array (470, 478). In this way, valid message data for a sleeping thread is stored between context switches.

Retaining, by the box controllers (464, 474) in the example NOC of FIG. 4, valid message data for the current thread (456) in the inbox and outbox until context switches again to the current thread may include associating the valid message data for the current thread with a thread identifier (554) of the current thread. The box controller (464, 472) may associate the valid message data for the current thread with a thread identifier of the current thread through use of valid bits (552) and thread IDs (554) written to registers in the box controller (464, 472) or into the array (470, 478) itself as part of the message data, in a message header, message meta-data, or the like.

Retaining, by the box controllers (464, 474) in the example NOC of FIG. 4, valid message data for the current thread (456) in the inbox (460) and outbox (462) until context switches again to the current thread (456) may also include setting a base pointer (558, 562) for the new thread so that, as valid message data is consumed by a recipient after the context switch, the new thread does not use storage locations in an array containing valid message data for the current thread. For an outbox, a recipient includes another IP block. For an inbox, a recipient includes the non-sleeping, 'new' thread of execution.

Retaining by the box controllers (464, 474) in the example NOC of FIG. 4, valid message data for the current thread (456) in the inbox (460) and outbox (462) until context switches again to the current thread may also include setting an offset pointer (556, 560) for the new thread so that, as valid message data is deposited after the context switch, the new thread does not use storage locations in the memory array containing valid message data for the current thread. For an outbox, valid message data may be deposited by the non-sleeping, 'new' thread of execution. For an inbox, valid message data may be deposited by another thread executing on another IP block, the intended recipient of the valid message data being the new thread of execution.

For further explanation, consider the example Table 1 below. Table 1 represents an example inbox array (470) that includes associated message data locations (550), valid bits (552), and thread identifications (554). The message data locations (550) identify elements of the array (470) in which valid message data is stored. The valid bits (552) indicate whether message data stored in an associated message data location has been consumed. The thread IDs (554) are unique identifications for threads of execution on a processor, whether currently executing or sleeping until a later context switch. Message data locations in some embodiments are the width of a packet, typically 64 bytes, although a single message, of course, may include many packets.

TABLE 1

| Inbox Array (470) | | | |
|---|---|---|---|
| Pointers | Message Data Locations (550) | Valid Bits (552) | Thread ID (554) |
| | 0 | 0 | 1 |
| | 1 | 0 | 1 |
| BasePtrTh1 (558) | 2 | 1 | 1 |
| | 3 | 1 | 2 |
| | 4 | 1 | 1 |
| | 5 | 1 | 1 |
| | 6 | 1 | 2 |
| | 7 | 1 | 2 |
| | 8 | 1 | 2 |
| | 9 | 1 | 1 |
| OffsetPtrTh1 (556) | 10 | 0 | 1 |
| | 11 | 1 | 2 |
| | 12 | 0 | 1 |
| | 13 | 0 | 2 |
| | ... | ... | ... |
| | ... | ... | ... |
| | ... | ... | ... |

Each record in the example of Table 1 indicates whether message data for a particular thread, stored in a particular message data location (550), is valid. In the example of Table 1, two threads, having thread ID 1 and thread ID 2, have valid message data in the inbox array (470).

The example inbox array (470) in Table 1 includes a base pointer (558) and offset pointer (556) for a current thread of execution, a thread characterized by a thread ID of '1'. A base pointer for an inbox defines the beginning of a portion of an inbox memory array (470) containing valid message data for the current thread. The base pointer (558) for thread 1, represented in Table 1 as 'BasePtrTh1,' is implemented in this example as an inbox read pointer (468) that points to the beginning message data location (550) in the array (470) where an associated thread of execution (456) may read the next message received from an outbox of some other IP block, that is, valid message data ready for consumption by a current thread running on a particular processor. An offset pointer (556) defines the extent of the portion of the memory array (470) containing valid message data for the current thread. The offset pointer for thread 1, represented in Table 1 as 'OffsetPtrTh1' is implemented in this example as an inbox write pointer that points to the beginning message data location (550) in the array (470) where message data from an outbox of another IP block is to be written. In the example of Table 1, the portion of the memory array containing valid message data for the current thread (456), thread 1, includes message data retained from one or more previous context switches for another thread of execution, thread 2.

Retaining the valid message data for the sleeping thread, thread 2, in the inbox until context switches again to thread 2, may include setting, by an inbox controller, a base pointer (558) for thread 1 so that, as valid message data is consumed by thread 1, thread 1 does not use storage locations in an array containing valid message data for the thread 2. Consider, for example, that thread 1 reads message data stored in location 2 from the inbox array (470) in Table 1. Instead of setting the value of BasePtrTh1 to point to message data location 3, the inbox controller determines that the thread ID associated with message data location 3 does not match the thread ID of the currently executing thread, thread 1, and sets the value of BasePtrTh1 to point to message data location 4, where valid message data for thread 1 is stored. Also upon setting the BasePtrTh1 as such, the inbox controller sets the valid bit associated with message data location 2 in the memory array (470) to zero in order to reflect that no valid data exists in message data location 2.

Retaining the valid message data for thread 2 in the inbox until context switches again to thread 2, may also include setting an offset pointer for the thread 1 so that, as valid message data is deposited in the array for thread 1, thread 1 does not use storage locations in the memory array containing valid message data for thread 2. Consider, for example, that message data for thread 1 is received by the inbox controller (464) from an outbox of another IP block and stored in message data location 10 of the inbox array. Instead of setting the value of OffsetPtrTh1 to point to message data location 11, the inbox controller determines that valid data exists in message data location 11, determines that the thread ID associated with message data location 11 does not match the thread ID of the currently executing thread 1, and sets the value of OffsetPtrTh1 to point to message data location 12, where valid message data for thread 1 may be stored. If valid data did not exist in message data location 11, the inbox controller may set the value of the OffsetPtrTh1 to point to message data location 11 and change the thread ID associated with message data location 11 to thread 1. Upon storing, by the inbox controller, valid message data in a message data storage location, the inbox controller sets the valid bit associated with the message data storage location to one.

As mentioned above, software (564 on FIG. 4) running in the current thread, upon a context switch to a new thread, is configured to reset the pointer values to identify valid message data for the new thread. The software (564 on FIG. 4) may reset the pointer values to identify valid message data for the new thread by restoring the pointer values for the new thread from memory if the new thread was run previously on the particular processor before a prior context switch. The software (564 on FIG. 4) may restore pointer values for the new thread by transmitting to the box controllers values of previously saved pointers for the new thread and a notification of the context switch to the new thread. Turning again to the example of Table 1 above for further explanation, consider that the software (564 on FIG. 4) running in thread 1, the current thread, upon a context switch to a new thread, thread 2, resets the pointer values to identify valid message data for the new thread, thread 2 by restoring the pointer values for thread 2 from memory. In this example, the software (564 on FIG. 4) running in thread 1 may restore the pointer values for thread 2 from memory by transmitting to the inbox controller the value of the previously saved pointers for thread 2, and a notification of the context switch to thread 2. Upon receipt of such, the inbox controller may set the values of the inbox read pointer and inbox write pointer to the previously saved values of the base pointer and the offset pointer for thread 2. In this example, the previously saved value of the base pointer for thread 2 points to message data location 3 and the previously saved value of the offset pointer for thread 2 points to the message data location 13.

If the new thread has not run previously on the particular processor, resetting the pointer values to identify valid message data for the new thread may include setting, by the software (564 on FIG. 4) running the current thread, the pointer values for the new thread to point to the origin of the memory array. Setting, by the software (564) running in the current thread, the pointer values for the new thread to point to the origin of the memory array may include transmitting to the box controllers a memory location of the origin of each memory array and a notification of the context switch to the new thread. Turning again for further explanation to the example of Table 1 above, consider that the software (564) running in thread 1, the current thread, upon a context switch to a new thread, thread 3 (not shown), resets the pointer values to identify valid message data for the new thread, thread 3 by setting, by the software (564) running thread 1, the pointer values for the thread 3 to point to the origin of the memory array (470). In this example, the software (564) running in thread 1 may set the pointer values for the thread 3 to point to the origin of the memory array (470) by transmitting to the inbox controller (464) a memory location of the origin of the memory array (470) and a notification of the context switch to thread 3. Upon receipt of such, the inbox controller is configured to set pointers to the inbox that identify valid message data for thread 3. That is, the inbox controller is configured to set the values of the base pointer and offset pointer for thread 3 to point to the next message data location in the memory array (470) having non-valid data. In Table 1, the next message data location in the memory array (470) having non-valid data is memory location 0.

Table 1 includes an example inbox memory array for ease of explanation. Readers of skill in the art will recognize, however, that retaining valid message data for a current thread and resetting pointer values to identify valid message data for a new thread are carried out with respect to an outbox and an outbox memory array in a similar manner to that described above with respect to the inbox.

Figure 5:
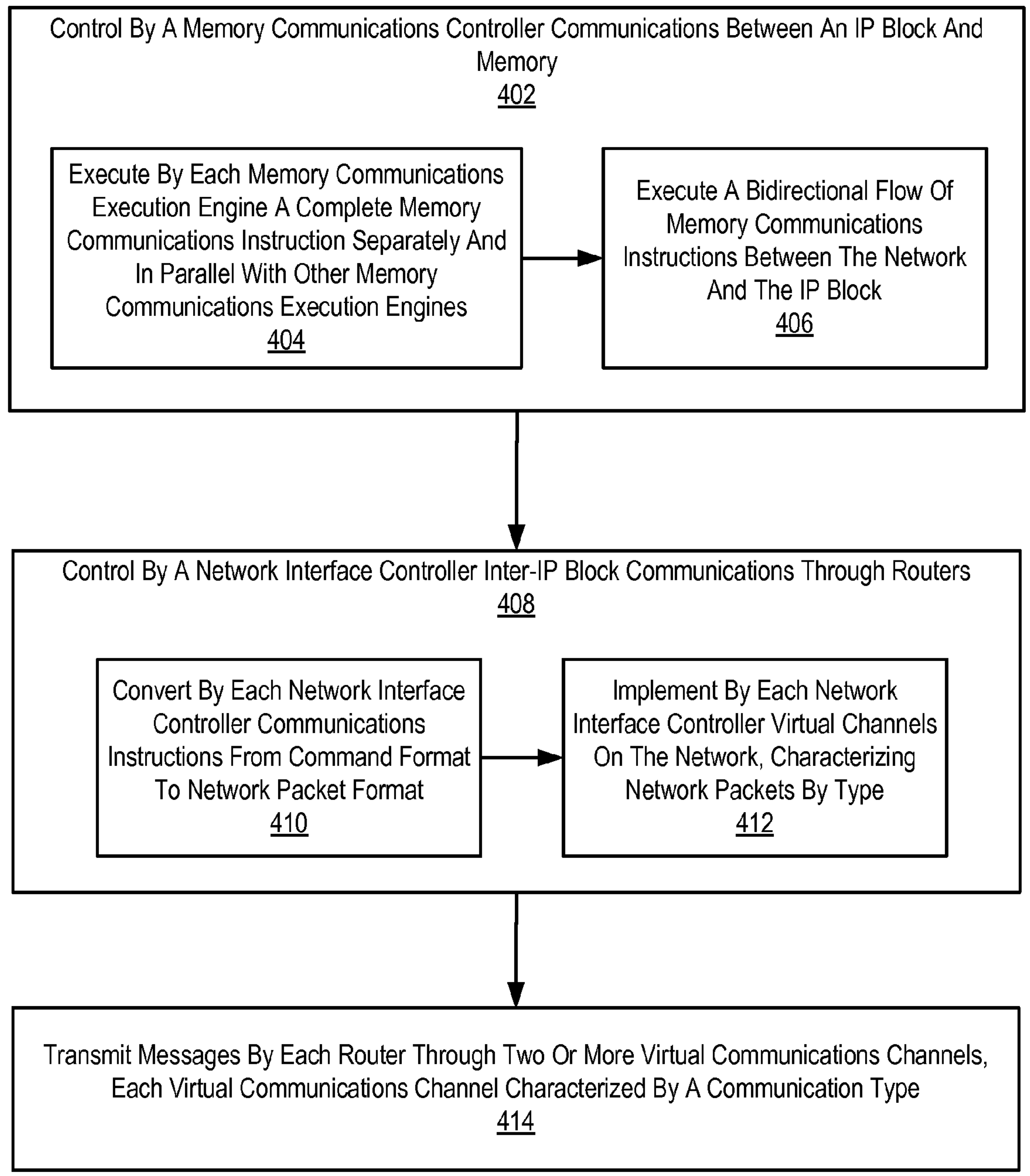
FIG. 5 sets forth a flow chart illustrating an exemplary method for data processing with a NOC according to embodiments of the present invention.

For further explanation, FIG. 5 sets forth a flow chart illustrating an exemplary method for data processing with a NOC according to embodiments of the present invention. The method of FIG. 5 is implemented on a NOC similar to the ones described above in this specification, a NOC (102 on FIG. 3) that is implemented on a chip (100 on FIG. 3) with IP blocks (104 on FIG. 3), routers (110 on FIG. 3), memory communications controllers (106 on FIG. 3), and network interface controllers (108 on FIG. 3). Each IP block (104 on FIG. 3) is adapted to a router (110 on FIG. 3) through a memory communications controller (106 on FIG. 3) and a network interface controller (108 on FIG. 3). In the method of FIG. 5, each IP block may be implemented as a reusable unit of synchronous or asynchronous logic design used as a building block for data processing within the NOC.

The method of FIG. 5 includes controlling (402) by a memory communications controller (106 on FIG. 3) communications between an IP block and memory. In the method of FIG. 5, the memory communications controller includes a plurality of memory communications execution engines (140 on FIG. 3). Also in the method of FIG. 5, controlling (402) communications between an IP block and memory is carried out by executing (404) by each memory communications execution engine a complete memory communications instruction separately and in parallel with other memory communications execution engines and executing (406) a bidirectional flow of memory communications instructions between the network and the IP block. In the method of FIG. 5, memory communications instructions may include translation lookaside buffer control instructions, cache control instructions, barrier instructions, memory load instructions, and memory store instructions. In the method of FIG. 5, memory may include off-chip main RAM, memory connected directly to an IP block through a memory communications controller, on-chip memory enabled as an IP block, and on-chip caches.

The method of FIG. 5 also includes controlling (408) by a network interface controller (108 on FIG. 3) inter-IP block communications through routers. In the method of FIG. 5, controlling (408) inter-IP block communications also includes converting (410) by each network interface controller communications instructions from command format to network packet format and implementing (412) by each network interface controller virtual channels on the network, including characterizing network packets by type.

The method of FIG. 5 also includes transmitting (414) messages by each router (110 on FIG. 3) through two or more virtual communications channels, where each virtual communications channel is characterized by a communication type. Communication instruction types, and therefore virtual channel types, include, for example: inter-IP block network-address-based messages, request messages, responses to request messages, invalidate messages directed to caches; memory load and store messages; and responses to memory load messages, and so on. In support of virtual channels, each router also includes virtual channel control logic (132 on FIG. 3) and virtual channel buffers (134 on FIG. 3). The virtual channel control logic examines each received packet for its assigned communications type and places each packet in an outgoing virtual channel buffer for that communications type for transmission through a port to a neighboring router on the NOC.

Figure 6:
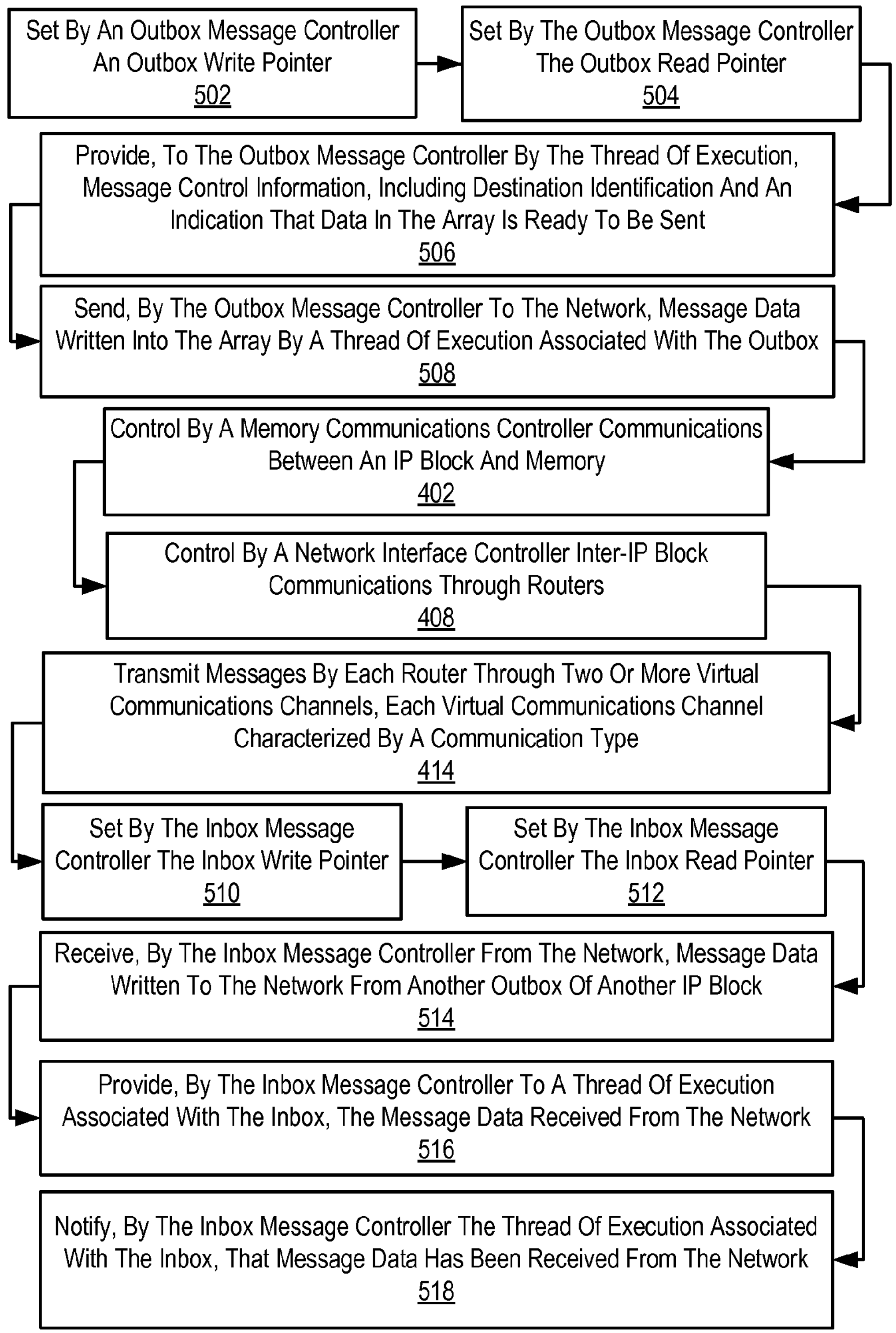
FIG. 6 sets forth a flow chart illustrating a further exemplary method for data processing with a NOC according to embodiments of the present invention.

For further explanation, FIG. 6 sets forth a flow chart illustrating a further exemplary method for data processing with a NOC according to embodiments of the present invention. The method of FIG. 6 is similar to the method of FIG. 5 in that the method of FIG. 6 is implemented on a NOC similar to the ones described above in this specification, a NOC (102 on FIG. 3) that is implemented on a chip (100 on FIG. 3) with IP blocks (104 on FIG. 3), routers (110 on FIG. 3), memory communications controllers (106 on FIG. 3), and network interface controllers (108 on FIG. 3). Each IP block (104 on FIG. 3) is adapted to a router (110 on FIG. 3) through a memory communications controller (106 on FIG. 3) and a network interface controller (108 on FIG. 3).

In the method of FIG. 6, each IP block (104 on FIG. 3) may be implemented as a reusable unit of synchronous or asynchronous logic design used as a building block for data processing within the NOC, and each IP block is also adapted to the network by a low latency, high bandwidth application messaging interconnect (107 on FIG. 4) comprising an inbox (460 on FIG. 4) and an outbox (462 on FIG. 4). In the method of FIG. 6, each outbox (462 on FIG. 4) includes an outbox message controller (472 on FIG. 4) and an array (478 on FIG. 4) for storing message data, with the array indexed by an outbox write pointer (474 on FIG. 4) and an outbox read pointer (476 on FIG. 4). In the method of FIG. 6, each inbox (460 on FIG. 4) includes an inbox message controller (464 on FIG. 4) and an array (470 on FIG. 4) for storing message data, with the array (470 on FIG. 4) indexed by an inbox write pointer (466 on FIG. 4) and an inbox read pointer (468 on FIG. 4).

The method of FIG. 6, like the method of FIG. 5, the following methods steps which operate in a similar manner as described above with regard to the method of FIG. 5: controlling (402) by each memory communications controller communications between an IP block and memory, controlling (408) by each network interface controller inter-IP block communications through routers, and transmitting (414) messages by each router (110 on FIG. 3) through two or more virtual communications channels, where each virtual communications channel is characterized by a communication type.

In addition to its similarities to the method of FIG. 5, however, the method of FIG. 6 also includes setting (502) by the outbox message controller the outbox write pointer. The outbox write pointer (474 on FIG. 4) may be implemented, for example, as a register in the outbox message controller (472 on FIG. 4) that stores the memory address of the location in the array where the associated thread of execution is authorized to write message data.

The method of FIG. 6 also includes setting (504) by the outbox message controller the outbox read pointer. The outbox read pointer (476 on FIG. 4) may be implemented, for example, as a register in the outbox message controller (472 on FIG. 4) that stores the memory address of the location in the array where the outbox message controller is to read its next message data for transmission over the network from the outbox.

The method of FIG. 6 also includes providing (506), to the outbox message controller by the thread of execution, message control information, including destination identification and an indication that data in the array is ready to be sent. The message control information, such as destination address or message identification, and other control information such as 'ready to send,' may be written to registers in the outbox message controller (472 on FIG. 4) or such information may be written into the array (478 on FIG. 4) itself as part of the message data, in a message header, message meta-data, or the like.

The method of FIG. 6 also includes sending (508), by the outbox message controller to the network, message data written into the array by a thread of execution associated with the outbox. In the NOC upon which the method of FIG. 6 is implemented, each network interface controller (108 on FIG. 4) is enabled to convert communications instructions from command format to network packet format for transmission among the IP blocks (104 on FIG. 4) through routers (110 on FIG. 4). The communications instructions are formulated in command format by the associated thread of execution (458 on FIG. 4) in the IP block (104 on FIG. 4) and provided by the outbox message controller (472 on FIG. 4) to the network interface controller (108 on FIG. 4) in command format. The command format is a native format that conforms to architectural register files of the IP block (104 on FIG. 4) and the outbox message controller (472 on FIG. 4). The network packet format is the format required for transmission through routers (110 on FIG. 4) of the network. Each such message is composed of one or more network packets. Such communications instructions may include, for example, communications instructions that send messages among IP blocks carrying data and instructions for processing the data among IP blocks in parallel applications and in pipelined applications.

The method of FIG. 6 also includes setting (510) by the inbox message controller the inbox write pointer. The inbox write pointer (466 on FIG. 4) may be implemented, for example, as a register in the inbox message controller (464 on FIG. 4) that stores the memory address of the beginning location in the array (470 on FIG. 4) where message data from an outbox of another IP block is to be written.

The method of FIG. 6 also includes setting (512) by the inbox message controller the inbox read pointer. The inbox read pointer (468 on FIG. 4) may be implemented, for example, as a register in the inbox message controller (464 on FIG. 4) that stores the memory address of the beginning location in the array (470 on FIG. 4) where an associated thread of execution (456 on FIG. 4) may read the next message received from an outbox of some other IP block.

The method of FIG. 6 also includes receiving (514), by the inbox message controller from the network, message data written to the network from another outbox of another IP block, and providing (516), by the inbox message controller to a thread of execution associated with the inbox, the message data received from the network. The inbox message controller (464 on FIG. 4) is enabled to receive from the network message data written to the network from an outbox of another IP block and provide to a thread of execution (456 on FIG. 4) associated with the inbox (460 on FIG. 4) the message data received from the network. The inbox message controller of FIG. 4 receives from a network interface controller (108 on FIG. 4) message data from an outbox of some other IP block and writes the received message data to the array (470 on FIG. 4).

The method of FIG. 6 also includes notifying (518), by the inbox message controller the thread of execution associated with the inbox, that message data has been received from the network. Upon writing the received message data to the array, an inbox message controller (464 on FIG. 4) is also enabled to notify the thread of execution (456 on FIG. 4) associated with the inbox that message data has been received from the network by, for example, setting a data-ready flag in a status register of the inbox message controller (464 on FIG. 4). The associated thread of execution may, for example, 'sleep until flag' before a message load, or a load opcode can be configured to check a data-ready flag in the inbox message controller.

Figure 7:
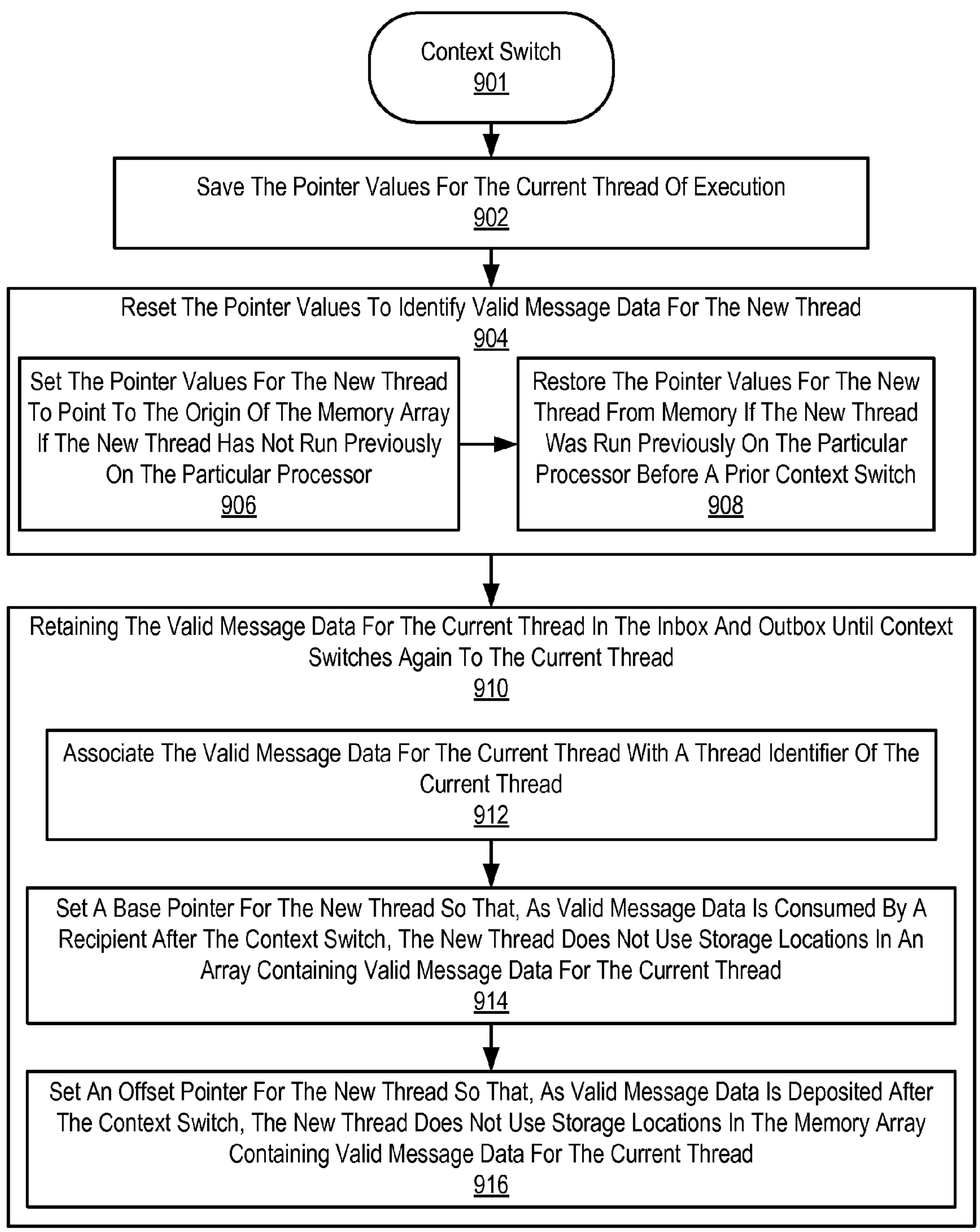
FIG. 7 sets forth a flow chart illustrating a further exemplary method for data processing with a NOC according to embodiments of the present invention.

For further explanation, FIG. 7 sets forth a flow chart illustrating a further exemplary method for data processing with a NOC according to embodiments of the present invention. The method of FIG. 7 is implemented on a NOC similar to the ones described above in this specification, a NOC (102 on FIG. 3) that is implemented on a chip (100 on FIG. 3) with IP blocks (104 on FIG. 3), routers (110 on FIG. 3), memory communications controllers (106 on FIG. 3), and network interface controllers (108 on FIG. 3). Each IP block (104 on FIG. 3) is adapted to a router (110 on FIG. 3) through a memory communications controller (106 on FIG. 3) and a network interface controller (108 on FIG. 3). Each memory communications controller (106 on FIG. 3) controls communication between an IP block and memory and each network interface controller (108 on FIG. 3) controls inter-IP block communications through routers. On a NOC on which the method of FIG. 7 is implemented, each IP block is further adapted to the network by a low latency, high bandwidth application messaging interconnect (107 on FIG. 4) comprising an inbox (460 on FIG. 4) and an outbox (462 on FIG. 4), and each IP block also includes a processor (126) supporting a plurality of threads (452-458) of execution. Also on a NOC on which the method of FIG. 7 is implemented, the NOC includes an inbox controller configured to set pointers to the inbox that identify valid message data for a current thread of execution running on a particular processor and an outbox controller configured to set pointers to the outbox that identify valid message data for a current thread of execution running on a particular processor.

Upon a context switch (901) to a new thread of execution, the method of FIG. 7 includes saving (902) the pointer values for the current thread of execution; resetting (904) the pointer values to identify valid message data for the new thread; and retaining (910) the valid message data for the current thread in the inbox and outbox until context switches again to the current thread.

In the method of FIG. 7, resetting (904) the pointer values to identify valid message data for the new thread is carried out by setting (906) the pointer values for the new thread to point to the origin of the memory array if the new thread has not run previously on the particular processor and restoring (908) the pointer values for the new thread from memory if the new thread was run previously on the particular processor before a prior context switch.

In the method of FIG. 7, retaining (910) the valid message data for the current thread in the inbox and outbox until context switches again to the current thread is carried out by associating (912) the valid message data for the current thread with a thread identifier of the current thread; setting (914) a base pointer for the new thread so that, as valid message data is consumed by a recipient after the context switch, the new thread does not use storage locations in an array containing valid message data for the current thread; and setting (916) an offset pointer for the new thread so that, as valid message data is deposited after the context switch, the new thread does not use storage locations in the memory array containing valid message data for the current thread.

Exemplary embodiments of the present invention are described largely in the context of a fully functional computer system for data processing on a NOC. Readers of skill in the art will recognize, however, that the present invention also may be embodied in a computer program product disposed on computer readable media for use with any suitable data processing system. Such computer readable media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web as well as wireless transmission media such as, for example, networks implemented according to the IEEE 802.11 family of specifications. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A network on chip (NOC) comprising:

integrated processor (IP) blocks, routers, memory communications controllers, and network interface controllers, each IP block adapted to a router through a memory communications controller and a network interface controller, each memory communications controller controlling communication between an IP block and memory, each network interface controller controlling inter-IP block communications through routers, each IP block further adapted to a network by a low latency, high bandwidth application messaging interconnect comprising an inbox and an outbox, one or more of the IP blocks further comprising computer processors supporting a plurality of threads of execution, the NOC further comprising:

an inbox controller configured to set pointers to identify a portion of a memory array of the inbox that contains valid message data for a current thread of execution running on a particular processor;

an outbox controller configured to set pointers to identify a portion of a memory array of the outbox that contains valid message data for the current thread of execution running on a particular processor; and software running in the current thread of execution that, upon a context switch from the current thread of execution to a new thread of execution, is configured to:

save values corresponding to the pointers for the current thread of execution, and reset the values corresponding to the pointers to identify valid message data for the new thread, the inbox controller and the outbox controller further configured to retain the valid message data for the current thread in the inbox and the outbox until context switches again to the current thread.

2. The NOC of claim 1 wherein valid message data comprises message data in an inbox not yet read by its recipient and message data in an outbox not yet delivered to its recipient.

3. The NOC of claim 1 wherein the pointers further comprise a base pointer and an offset pointer, the base pointer defining a beginning of a portion of a memory array containing valid message data for the current thread, the offset pointer defining an extent of the portion of the memory array containing valid message data for the current thread, and the portion of the memory array containing valid message data for the current thread optionally also including message data retained from one or more previous context switches to another thread of execution.

4. The NOC of claim 1 wherein software running in the current thread of execution configured to reset the values corresponding to the pointers to identify valid message data for the new thread further comprises software running in the current thread of execution configured to:

set pointer values for the new thread to point to an origin of a memory array if the new thread has not run previously on the particular processor; and restore pointer values for the new thread from memory if the new thread was run previously on the particular processor before a prior context switch.

5. The NOC of claim 1 wherein the inbox controller and the outbox controller further configured to retain the valid message data for the current thread in the inbox and the outbox until context switches again to the current thread further comprises the inbox controller and the outbox controller further configured to:

associate the valid message data for the current thread with a thread identifier of the current thread;

set a base pointer for the new thread so that, as valid message data is consumed by a recipient after the context switch, the new thread does not use storage locations in a memory array containing valid message data for the current thread; and set an offset pointer for the new thread so that, as valid message data is deposited after the context switch, the new thread does not use storage locations in the memory array containing valid message data for the current thread.

6. The NOC of claim 1 wherein each IP block comprises a reusable unit of synchronous or asynchronous logic design used as a building block for data processing within the NOC.

7. A method of data processing on a network on chip (NOC), the NOC comprising: integrated processor (IP) blocks, routers, memory communications controllers, and network interface controllers, each IP block adapted to a router through a memory communications controller and a network interface controller, each memory communications controller controlling communication between an IP block and memory, each network interface controller controlling inter-IP block communications through routers, each IP block further adapted to a network by a low latency, high bandwidth application messaging interconnect comprising an inbox and an outbox, one or more IP block further comprising a processor supporting a plurality of threads of execution, the NOC further comprising an inbox controller configured to set pointers to identify a portion of a memory array of the inbox that contains valid message data for a current thread of execution running on a particular processor and an outbox controller configured to set pointers to identify a portion of a memory array of the outbox that contains valid message data for the current thread of execution running on the particular processor, the method comprising:

upon a context switch from the current thread of execution to a new thread of execution:

saving, by software running in the current thread of execution, values corresponding to the pointers for the current thread of execution;

resetting, by the software running in the current thread of execution, the values corresponding to the pointers to identify valid message data for the new thread; and retaining, by the inbox controller and the outbox controller, the valid message data for the current thread in the inbox and the outbox until context switches again to the current thread.

8. The method of claim 7 wherein valid message data comprises message data in an inbox not yet read by its recipient and message data in an outbox not yet delivered to its recipient.

9. The method of claim 7 wherein the pointers further comprise a base pointer and an offset pointer, the base pointer defining a beginning of a portion of a memory array containing valid message data for the current thread, the offset pointer defining an extent of the portion of the memory array containing valid message data for the current thread, and the portion of the memory array containing valid message data for the current thread optionally also including message data retained from one or more previous context switches to another thread of execution.

10. The method of claim 7 wherein resetting the values corresponding to the pointers to identify valid message data for the new thread further comprises:

setting pointer values for the new thread to point to the origin of the memory array if the new thread has not run previously on the particular processor; and restoring pointer values for the new thread from memory if the new thread was run previously on the particular processor before a prior context switch.

11. The method of claim 7 wherein retaining the valid message data for the current thread in the inbox and the outbox until context switches again to the current thread further comprises:

associating the valid message data for the current thread with a thread identifier of the current thread;

setting a base pointer for the new thread so that, as valid message data is consumed by a recipient after the context switch, the new thread does not use storage locations in a memory array containing valid message data for the current thread; and setting an offset pointer for the new thread so that, as valid message data is deposited after the context switch, the new thread does not use storage locations in the memory array containing valid message data for the current thread.

12. The method of claim 7 wherein each IP block comprises a reusable unit of synchronous or asynchronous logic design used as a building block for data processing within the NOC.

13. A computer program product for data processing on a network on chip (NOC), the NOC comprising: integrated processor (IP) blocks, routers, memory communications controllers, and network interface controllers, each IP block adapted to a router through a memory communications controller and a network interface controller, each memory communications controller controlling communication between an IP block and memory, each network interface controller controlling inter-IP block communications through routers, each IP block further adapted to a network by a low latency, high bandwidth application messaging interconnect comprising an inbox and an outbox, one or more IP block further comprising a processor supporting a plurality of threads of execution, the NOC further comprising an inbox controller configured to set pointers to identify a portion of a memory array of the inbox that contains valid message data for a current thread of execution running on a particular processor and an outbox controller configured to set pointers to identify a portion of a memory array of the outbox that contains valid message data for the current thread of execution running on a particular processor, the computer program product disposed in a computer readable medium, wherein the computer readable medium is not a signal, the computer program product comprising computer program instructions capable of:

saving, by software running in the current thread of execution, values corresponding to the pointers for the current thread of execution;

resetting, by the software running in the current thread of execution, values corresponding to the pointers to identify valid message data for the new thread; and retaining, by the inbox controller and the outbox controller, the valid message data for the current thread in the inbox and the outbox until context switches again to the current thread.

14. The computer program product of claim 13 wherein valid message data comprises message data in an inbox not yet read by its recipient and message data in an outbox not yet delivered to its recipient.

15. The computer program product of claim 13 wherein the pointers further comprise a base pointer and an offset pointer, the base pointer defining a beginning of a portion of a memory array containing valid message data for the current thread, the offset pointer defining an extent of the portion of the memory array containing valid message data for the current thread, and the portion of the memory array containing valid message data for the current thread optionally also including message data retained from one or more previous context switches to another thread of execution.

16. The computer program product of claim 13 wherein resetting the values corresponding to the pointers to identify valid message data for the new thread further comprises:

setting pointer values for the new thread to point to the origin of the memory array if the new thread has not run previously on the particular processor; and restoring pointer values for the new thread from memory if the new thread was run previously on the particular processor before a prior context switch.

17. The computer program product of claim 13 wherein retaining the valid message data for the current thread in the inbox and the outbox until context switches again to the current thread further comprises:

associating the valid message data for the current thread with a thread identifier of the current thread;

setting a base pointer for the new thread so that, as valid message data is consumed by a recipient after the context switch, the new thread does not use storage locations in a memory array containing valid message data for the current thread; and setting an offset pointer for the new thread so that, as valid message data is deposited after the context switch, the new thread does not use storage locations in the memory array containing valid message data for the current thread.

18. The computer program product of claim 13 wherein each IP block comprises a reusable unit of synchronous or asynchronous logic design used as a building block for data processing within the NOC.

* * * * *